(12) United States Patent
Baum et al.

(10) Patent No.: US 6,606,731 B1
(45) Date of Patent: Aug. 12, 2003

(54) INTELLIGENT WIRING DIAGRAM SYSTEM

(75) Inventors: Lawrence S. Baum, Bellevue, WA (US); John H. Boose, Bellevue, WA (US); Molly L. Boose, Bellevue, WA (US); Michael D. Post, Edmond, OK (US)

(73) Assignee: The Boeing Company, Seattle, WA (US)

( * ) Notice: Subject to any disclaimer, the term of this patent is extended or adjusted under 35 U.S.C. 154(b) by 232 days.

(21) Appl. No.: 09/615,499

(22) Filed: Jul. 13, 2000

Related U.S. Application Data

(60) Provisional application No. 60/147,272, filed on Aug. 5, 1999.

(51) Int. Cl.$^7$ .............................................. G06F 17/50
(52) U.S. Cl. .............................................. 716/3; 716/4
(58) Field of Search ........................ 716/3, 4; 703/14.2; 382/141, 145

(56) References Cited

U.S. PATENT DOCUMENTS

| | | | |
|---|---|---|---|
| 3,687,054 A | 8/1972 | Boberg | 98/33 |
| 4,819,548 A | 4/1989 | Horstman et al. | 98/1 |
| 5,109,353 A | 4/1992 | Sample et al. | 364/578 |
| 5,220,512 A | 6/1993 | Watkins et al. | 364/489 |
| 5,394,346 A | 2/1995 | Milsom | 364/578 |
| 5,475,804 A | 12/1995 | Bennett | 395/139 |
| 5,479,357 A | 12/1995 | Yoshimura | 364/489 |
| 5,623,418 A | 4/1997 | Rostoker et al. | 364/489 |
| 5,625,567 A * | 4/1997 | Mankin et al. | 716/3 |
| 5,694,481 A | 12/1997 | Lam et al. | 382/145 |
| 5,852,564 A | 12/1998 | King et al. | 364/578 |

OTHER PUBLICATIONS

Graphics Recognition for a Large–Scale Airplane Information System, L. Baum, pp 291–301.

* cited by examiner

Primary Examiner—Matthew Smith
Assistant Examiner—Naum B Levin
(74) Attorney, Agent, or Firm—Conrad O. Gardner

(57) ABSTRACT

An intelligent wiring diagram system for automatically converting electronic wiring diagrams into intelligent wiring diagrams for display on a computer terminal, the intelligent wiring diagram system primarily for use as an interactive tool for trouble-shooting electrical problems.

9 Claims, 23 Drawing Sheets

OTHER SYMBOL
RECOGNIZERS

*Fig. 27*

INTELLIGENT WIRING DIAGRAM SYSTEM

CROSS-REFERENCE TO RELATED APPLICATIONS

This application is being converted to a utility application from provisional patent application Ser. No. 60/147,272, filed Aug. 5, 1999.

TECHNICAL FIELD OF THE INVENTION

The present invention relates to electronic wiring diagrams and more particularly to a system for automatically converting legacy wiring diagrams into "intelligent wiring diagrams".

BACKGROUND OF THE INVENTION

Mechanics use wiring diagrams in the trouble-shooting of electrical problems on an airplane. The diagrams identify the wires and electrical components used in a particular subsystem of a plane, and also illustrate the flow of electricity through the circuits. However, the diagrams are difficult to read, electrical connectivity of electrical components is not always clear, and mechanics find it time consuming to manually look up component numbers in an electrical component database or large paper-based sources when there is no available database. This situation is exacerbated by the sheer volume of paper, as wiring manuals are often 5000 pages or more.

Most airplane systems have from dozens to hundreds of different potential configurations, reflecting different modifications, capabilities and manufacturing processes. Maintenance personnel spend a significant amount of time searching for the right configuration and consulting multiple volumes of binders to find the right component or system. Component density on the diagrams can also impede finding the right component on a diagram. These factors complicate the technician's job, as pressure increases to find and comprehend the necessary information quickly and accurately.

There are no approaches in use commercially that solve the problem of rendering wiring diagrams in electronic data products in a way that makes the diagrams easily comprehensible or useful for mechanics. For example, Wiring Diagrams are not yet available in a portable maintenance aid product, principally because no satisfactory solution could be found for adequately rendering them. Consequently, mechanics continue to deal with wiring problems by using paper copies of the diagrams. Commercial vendors are offering tools for creating intelligent wiring diagrams, but they require manual re-authoring of the data to identify objects and make them interactive. This re-authoring process is extremely labor-intensive and error-prone as it requires manually creating hundreds of individual mouse-sensitive areas for each drawing (this is called "hotspotting" or "creating hotspots") and specifying in a complex language what the system should do when the user points at or clicks each hotspots. For systems such as airplanes that involve many thousands of such diagrams, the cost of this manual approach is prohibitively expensive. Consequently, this invention provides capabilities that will otherwise not be made available.

SUMMARY OF THE INVENTION

This invention automatically converts legacy electronic wiring diagrams into "intelligent wiring diagrams". This significantly improves the usability of wiring diagrams when displayed on a computer and makes the trouble-shooting of electrical problems easier, faster and more reliable. Using the intelligent graphics viewer, users can quickly comprehend complex electrical circuitry, simulate the changes in electrical continuity and access critical component information.

The present Intelligent Wiring Diagram System automatically and quickly converts wiring diagrams into electronically useful, interactive graphics. This novel approach completely eliminates the need for manual re-authoring. Within a few seconds the software is able to accurately identify circuit continuity and nomenclature of interest and put hundreds of hotspots on a diagram. If an expert were asked to perform the same work, it would take many days of intensive labor to re-author and validate a single wiring diagram.

The invention consists of a set of software modules that perform the conversion and a graphics viewer that provides the interaction. These modules are:

A. ELECTRICAL COMPONENT RECOGNIZER

The Electrical Component Recognizer searches through the graphical primitives in the original wiring diagram and applies heuristics in order to identify components such as fuses, circuit breakers, various types of switches, electrical connectors and relays.

B. WIRENET RECOGNIZER

Using the electrical symbols found by the Electrical Component Recognizer, the Wirenet Recognizer employs a unique and powerful Attachment Point Algorithm to discover which lines in the diagram represent individual wires and to infer the electrical continuity. The algorithm works as follows:

For each electrical component there are predictable locations where wires can attach; these are the attachment points. For example, in a circuit breaker wires attach at the terminal circles. Similarly, there are attachment points for fuses, resistors, and the other electrical components, except connectors which are handled separately. Also, it is common for designers to erase part of a wire to make space for a text string such as the wire number or a notation. Consequently, for wirenet generation purposes, we consider text elements to have their own attachment points where wires may be attached.

C. NOMENCLATURE RECOGNIZER

Using text matching techniques, the Nomenclature Recognizer scans the text elements in the diagram and finds those that match wire numbers, wire bundles, grounds, splices, terminals and other equipment numbers from databases.

D. XML GENERATOR

Extensible Markup Language (XML) provides a standardized methodology for describing information in a document. We have created a unique Document Type Definition (DTD) for describing graphical objects and the relationships between them, including specific elements for describing electrical components and electrical continuity, as well as references to part information. The SGML Generator produces the XML markup for all of the objects discovered by the three recognizers (electrical components, wirenets and nomenclature). The markup includes the geometry for each object's hotspot and the relationships between objects and other objects and between objects and hotspots.

E. INTELLIGENT GRAPHICS VIEWER

Finally, the system includes a unique graphics viewer which not only renders the Wiring Diagram in its original form, but also uses the output of the XML generator to provide visual identification of objects and user-driven interactivity with the diagram. Every wirenet is "hot"; when the user points at the wire with a pointer device (e.g. a mouse), the wire and its complete continuity inmmediately highlight. Furthermore, the user can affect that continuity by interactively changing the state of electrical components. The viewer also allows full text searching and highlighting of hits found on the diagram.

BRIEF DESCRIPTION OF THE DRAWINGS

Figure 27:
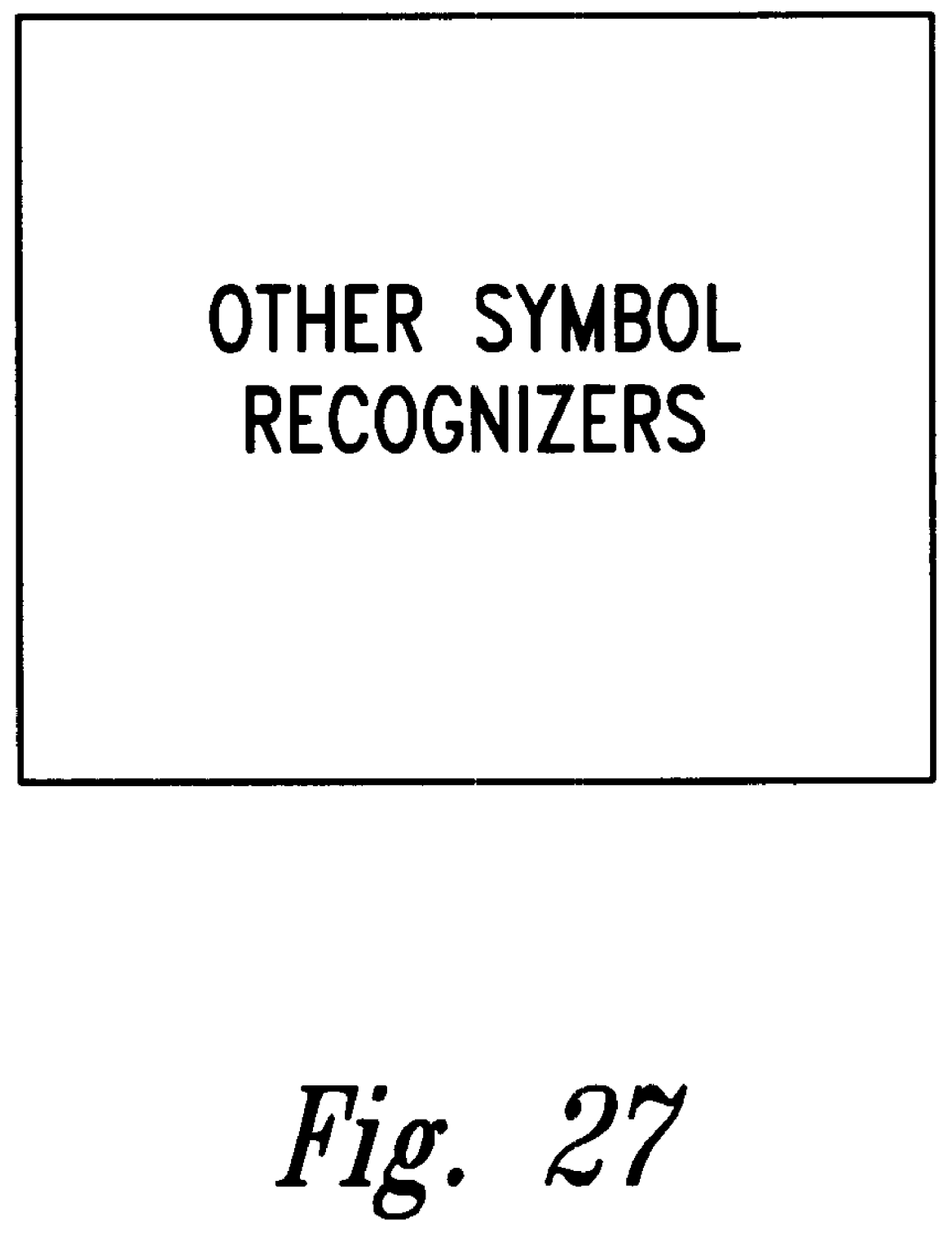

FIG. 27 is illustrative of other symbol recognizers working similarly.

DETAILED DESCRIPTION OF THE INVENTION

Intelligent Wiring Diagram System

Figure 1:
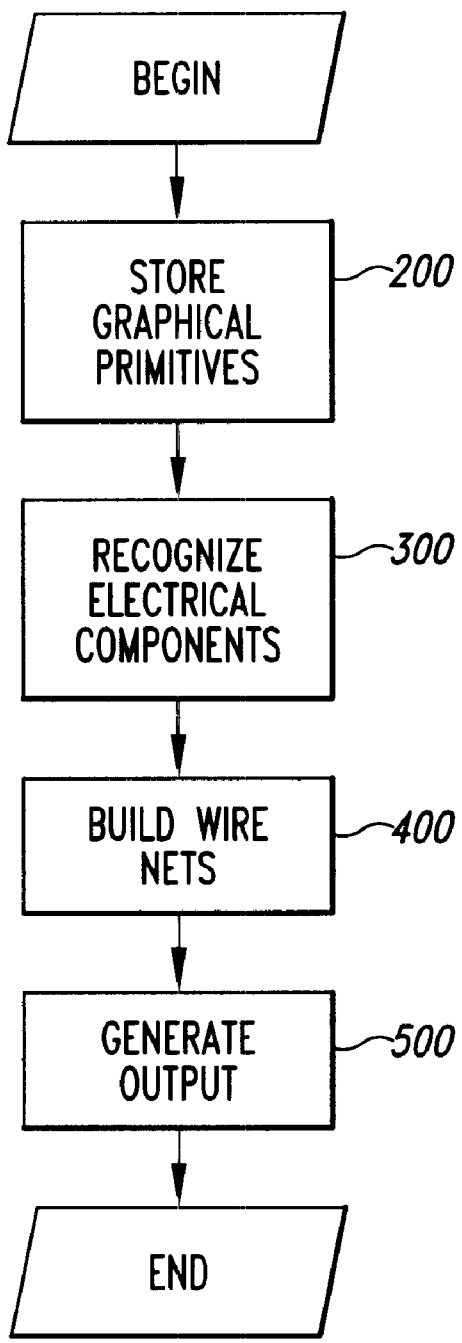
FIG. 1 is a diagram illustrative of the Intelligent Wiring Diagram Recognizer of the present invention showing Recognizer Top Level Flow.
Figure 2:
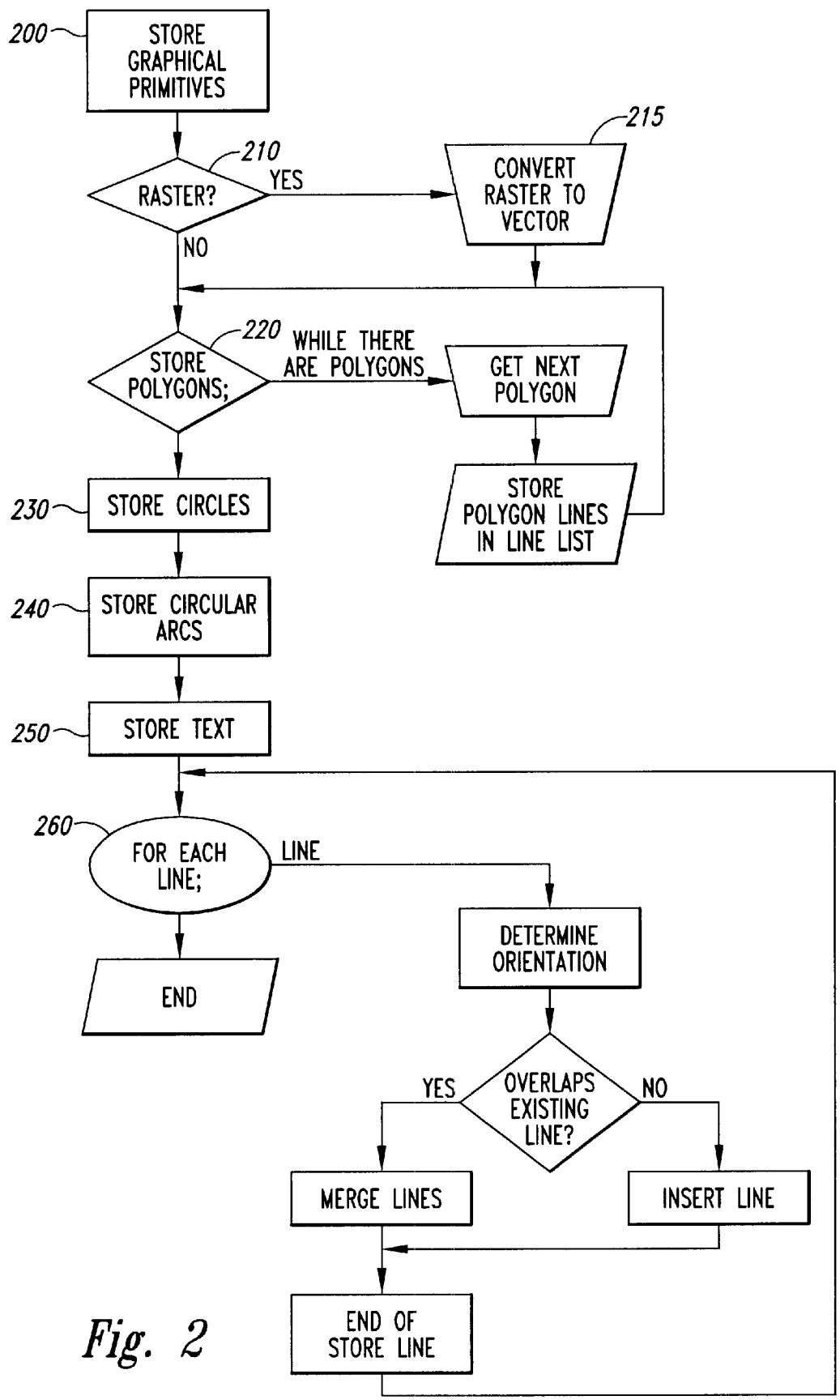
FIG. 2 is a diagram illustrative of 200 Store Graphical Primitives.
Figure 3:
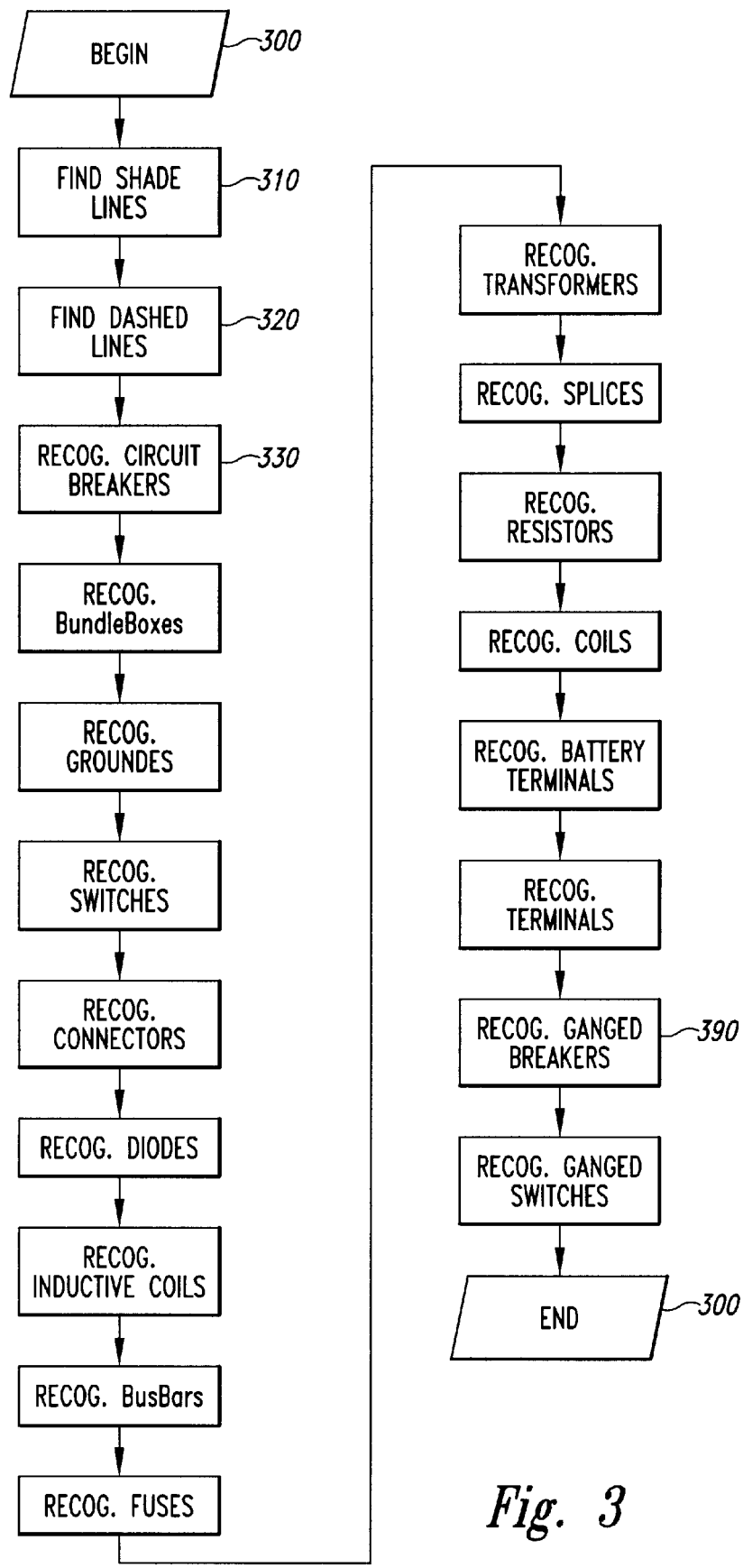
FIG. 3 is a diagram illustrative of 300 Recognize Symbols.
Figure 4:
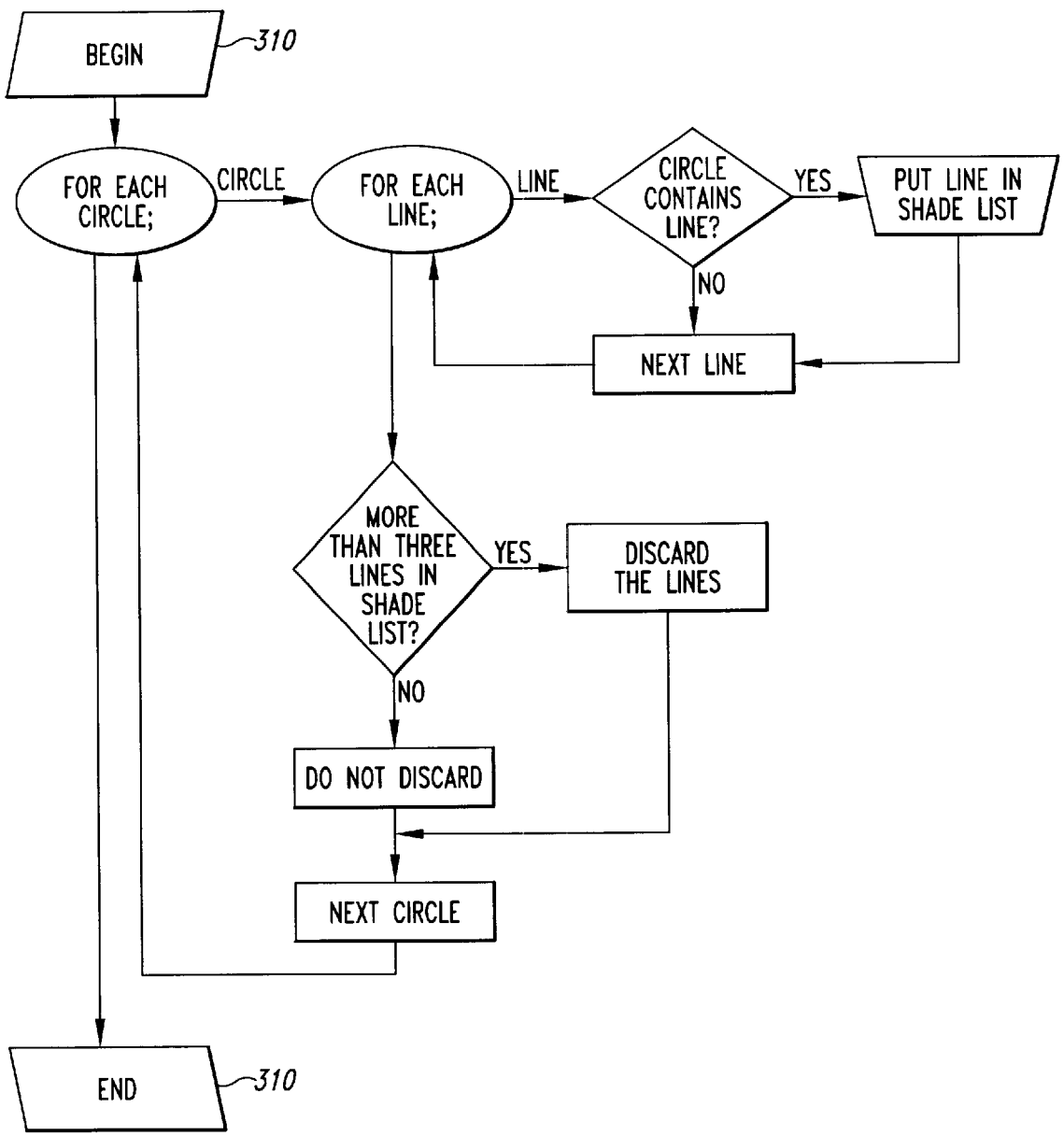
FIG. 4 is a diagram illustrative of 310 Discard shade lines.
Figure 5:
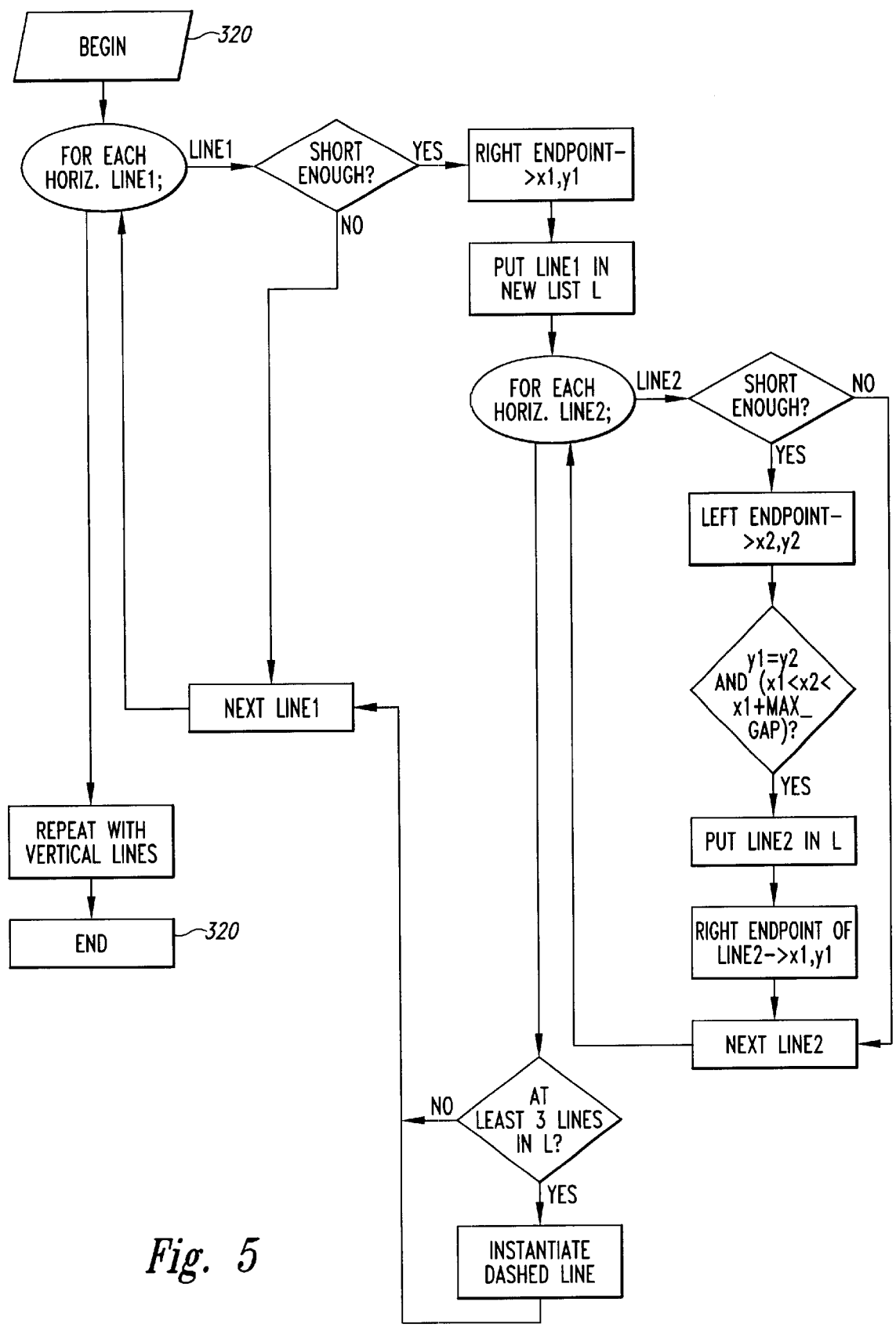
FIG. 5 is a diagram illustrative of 320 Find dashed lines.
Figure 6:
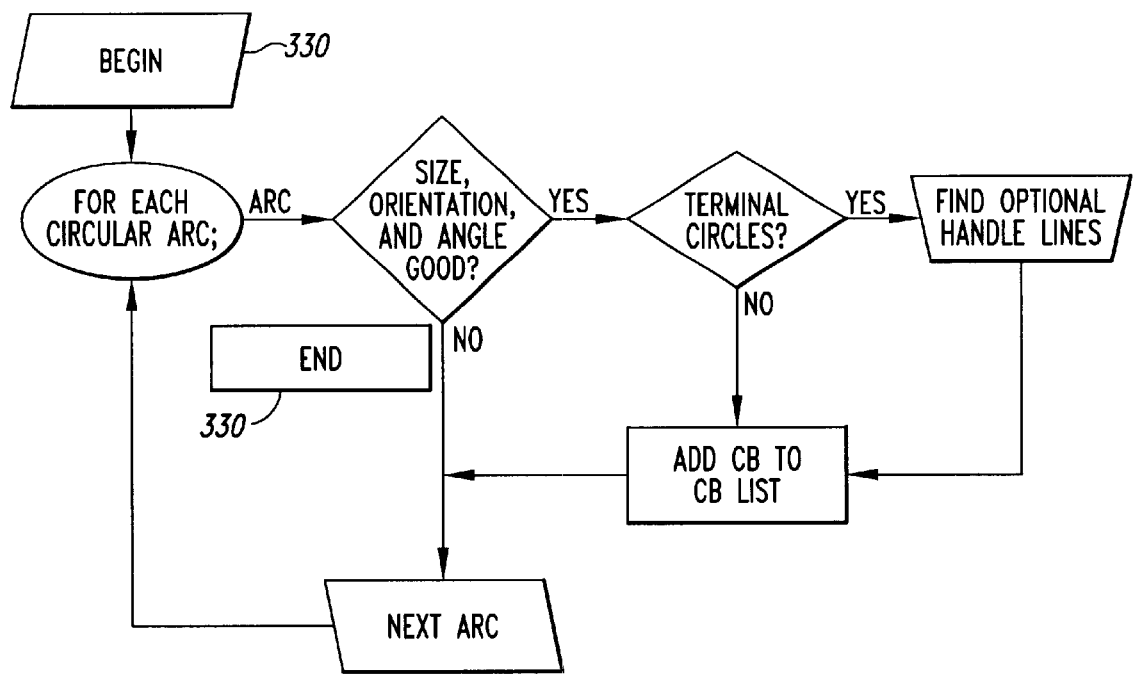
FIG. 6 is a diagram illustrative of Find Circuit Breakers.
Figure 7:
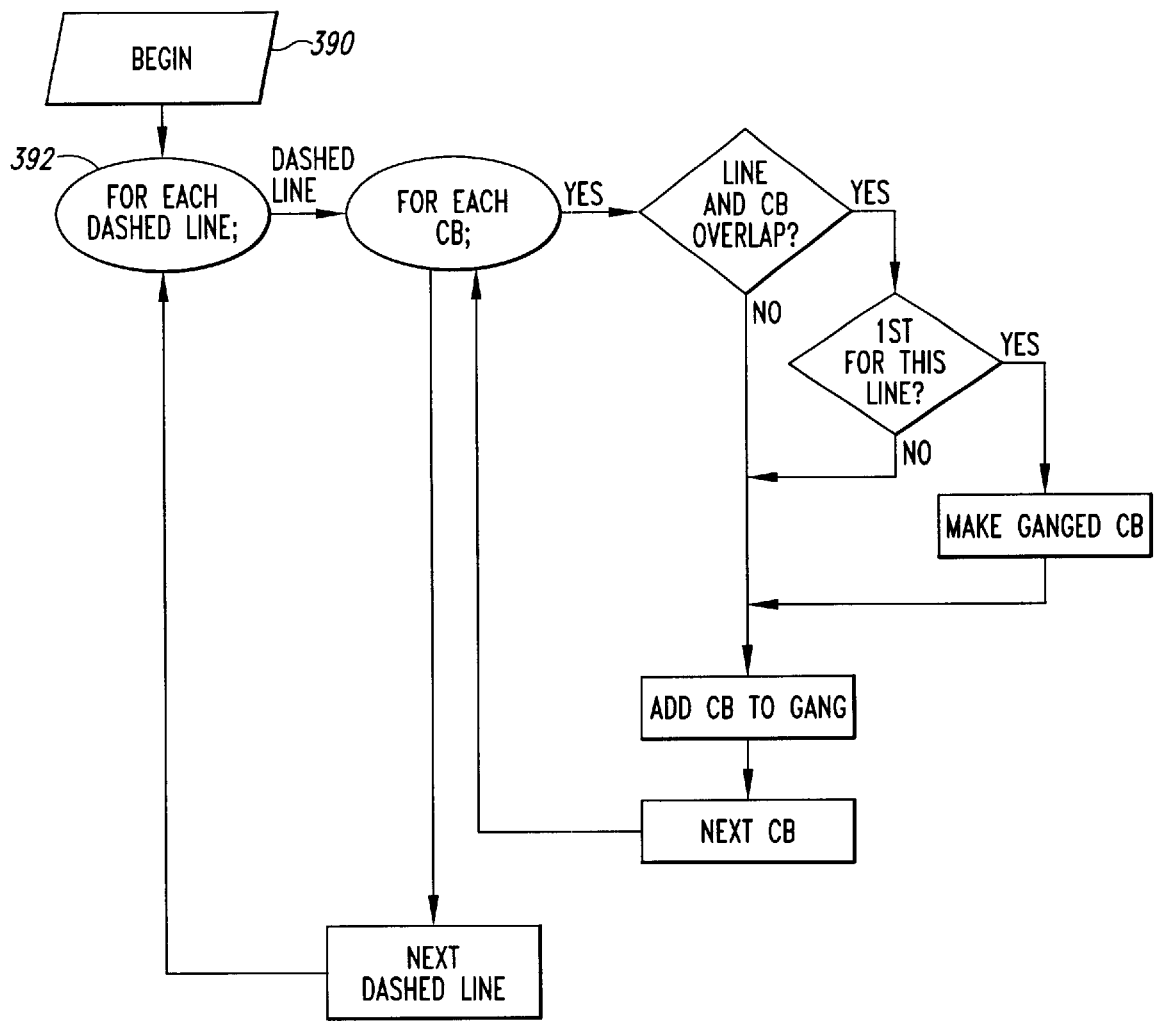
FIG. 7 is a diagram illustrative of 390 Recognize Ganged Circuit Breakers.
Figure 8:
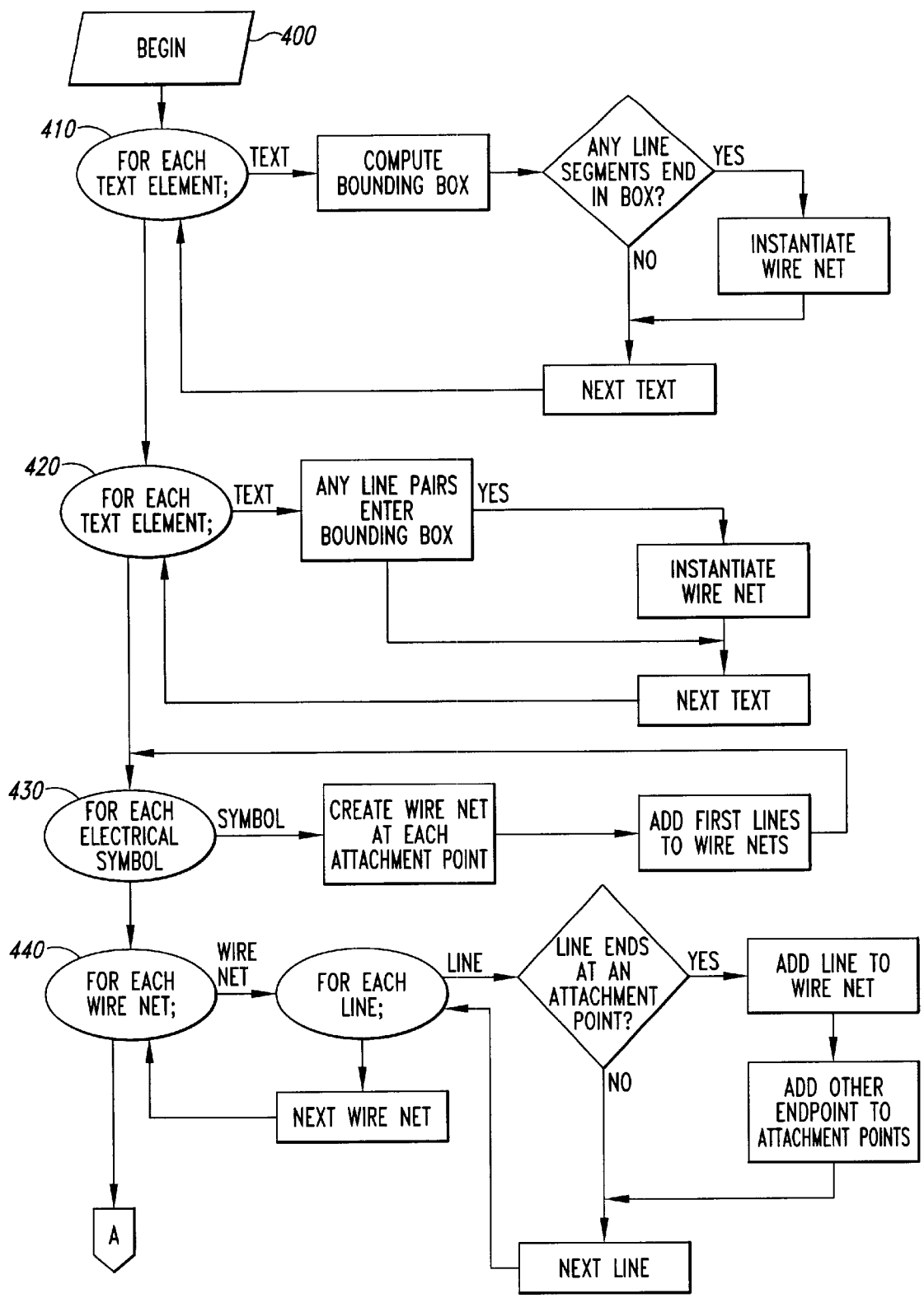
FIG. 8 is a diagram illustrative of 400 Recognize Wire Nets.
Figure 9:
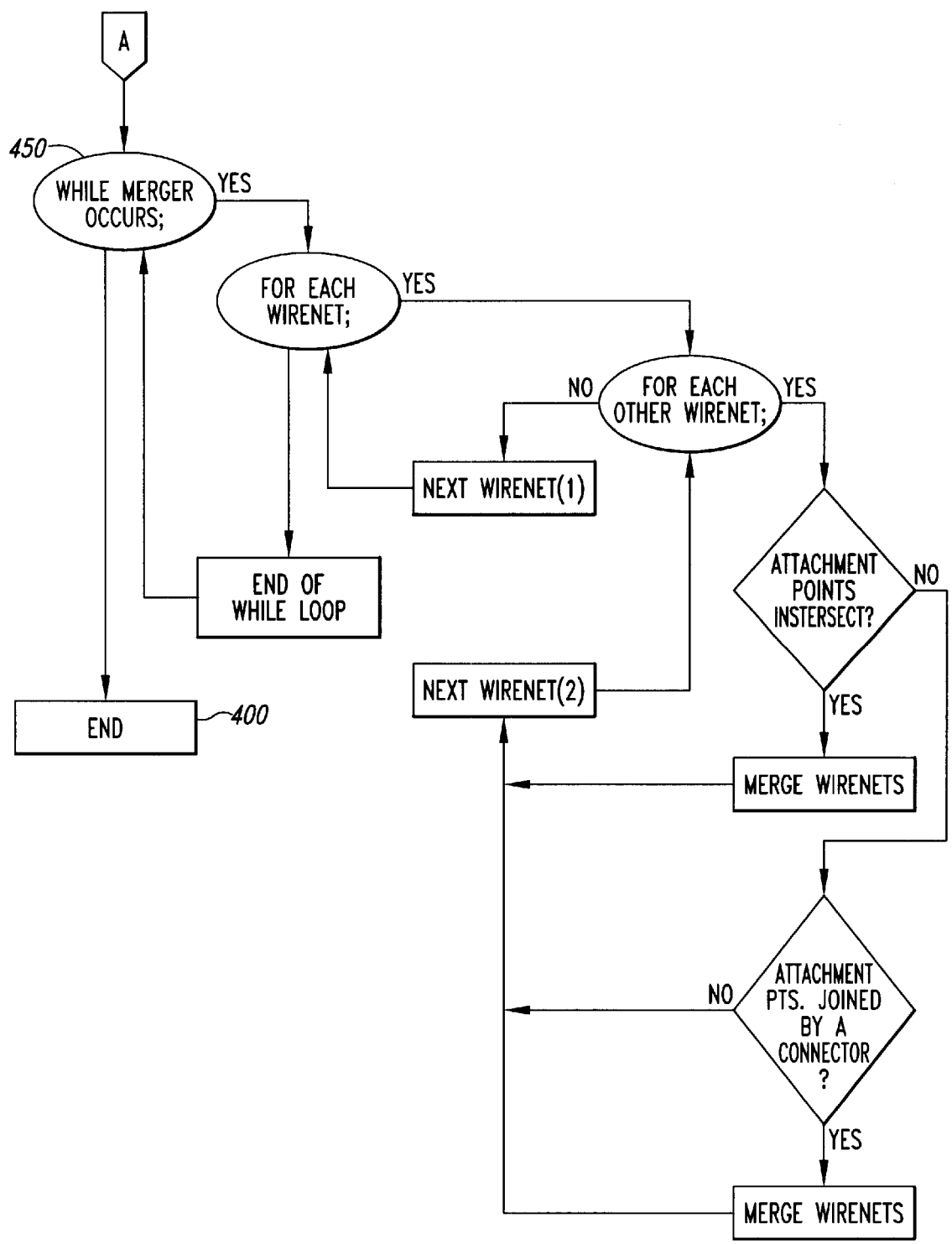
FIG. 9 is a diagram of 400 continued.
Figure 10:
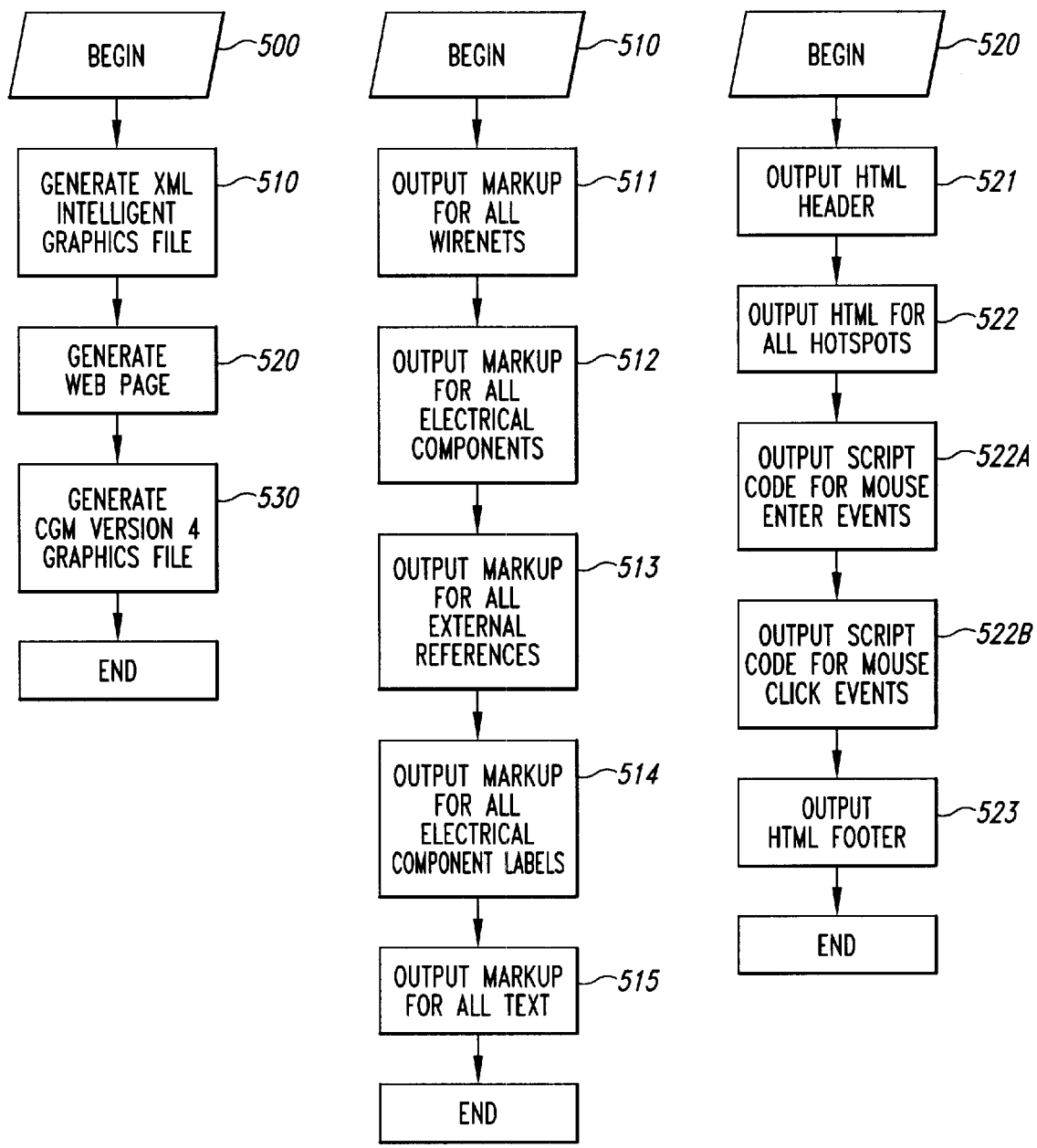
FIG. 10 is a diagram illustrative of 500 Generate Output, 510 Generate XML and 520 Generate HTML.
Figure 11:
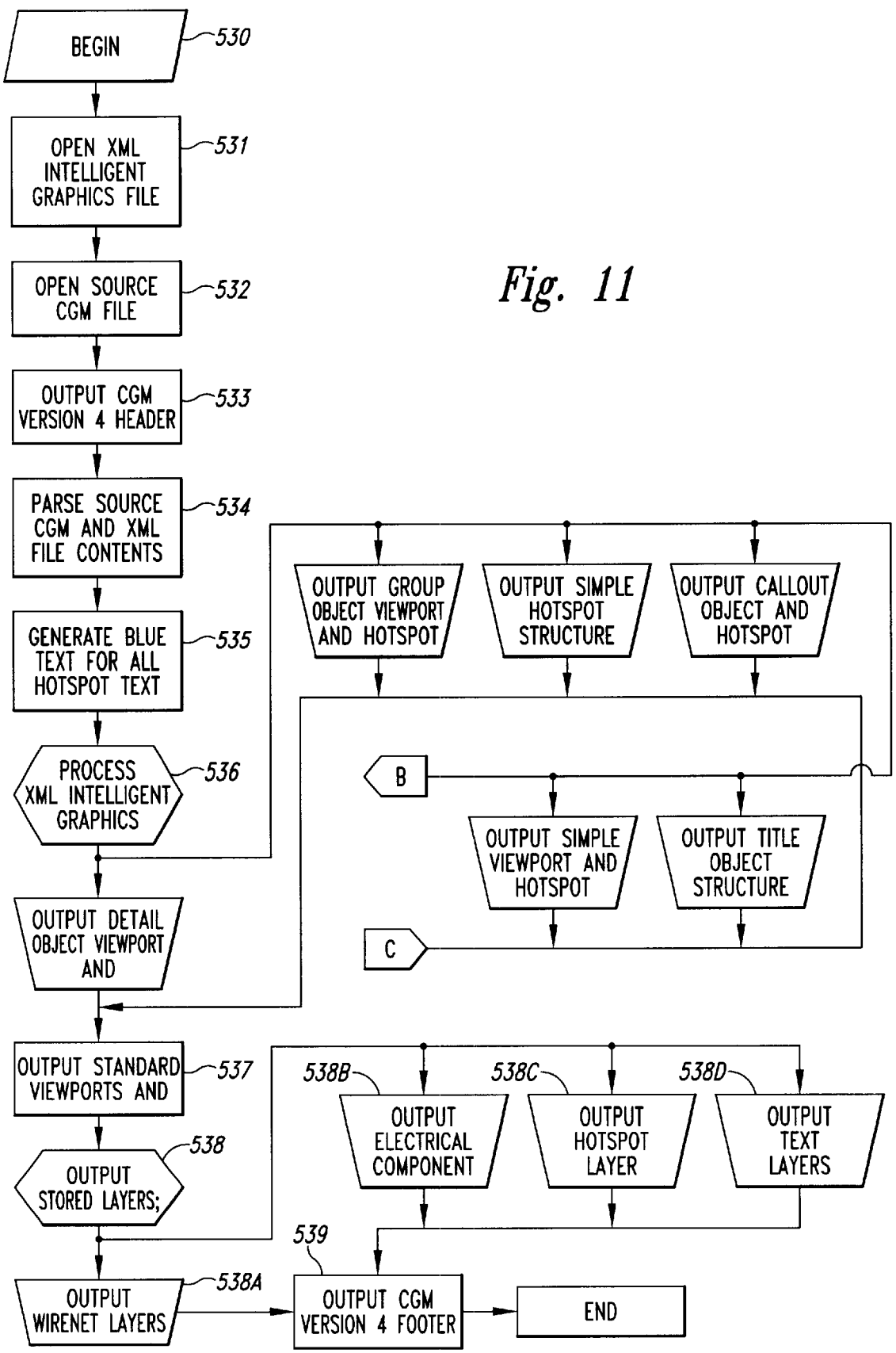
FIG. 11 is a diagram illustrative of 530 Generate CGM.
Figure 12:
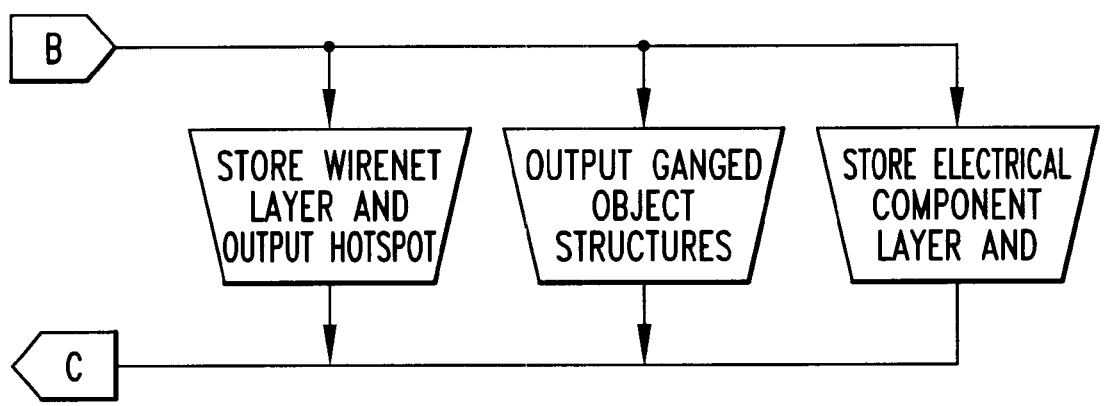
FIG. 12 is a diagram of 530 continued.
Figure 13:
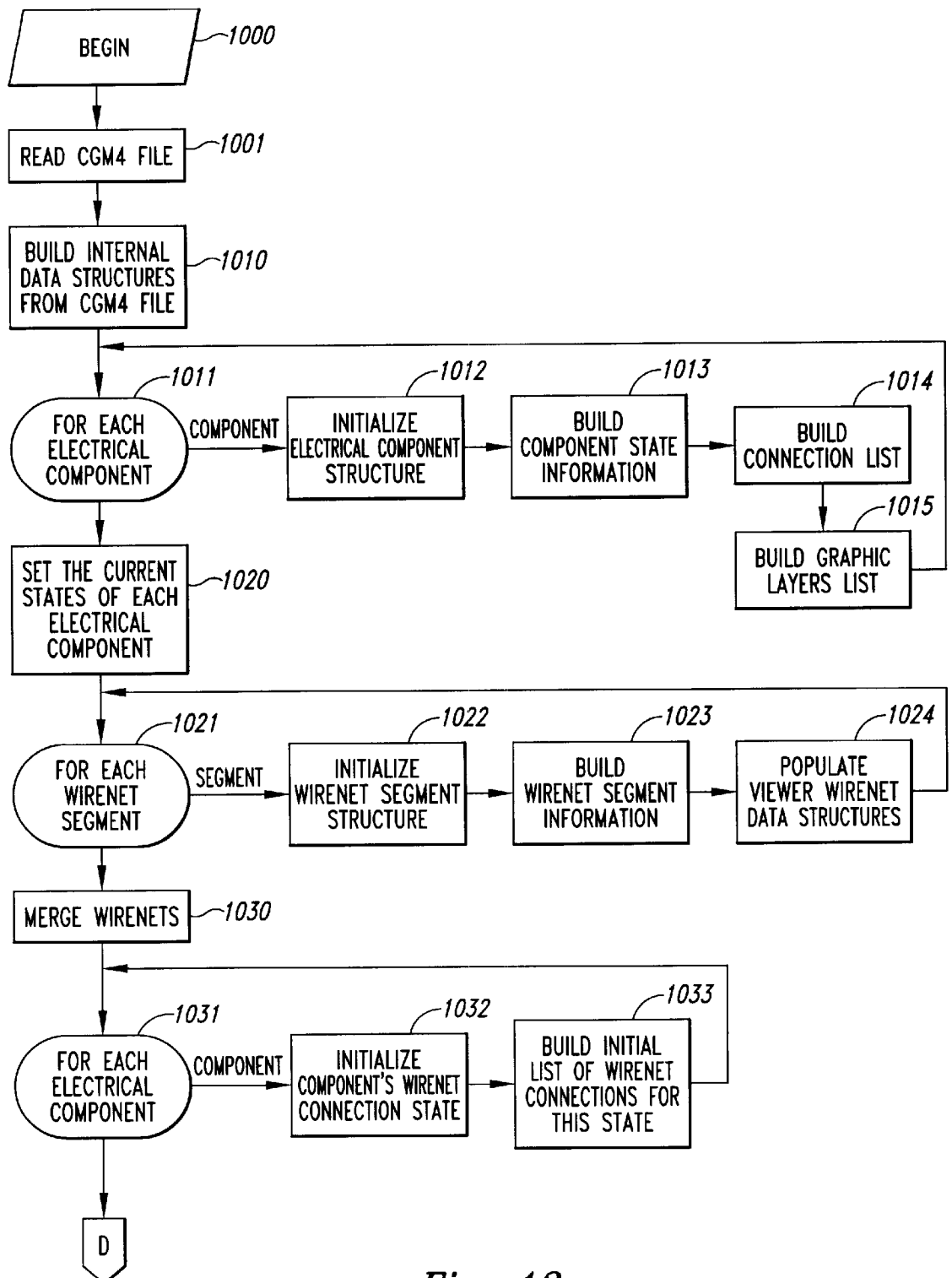
FIG. 13 is a diagram illustrative of 1000 IG Viewer.
Figure 14:
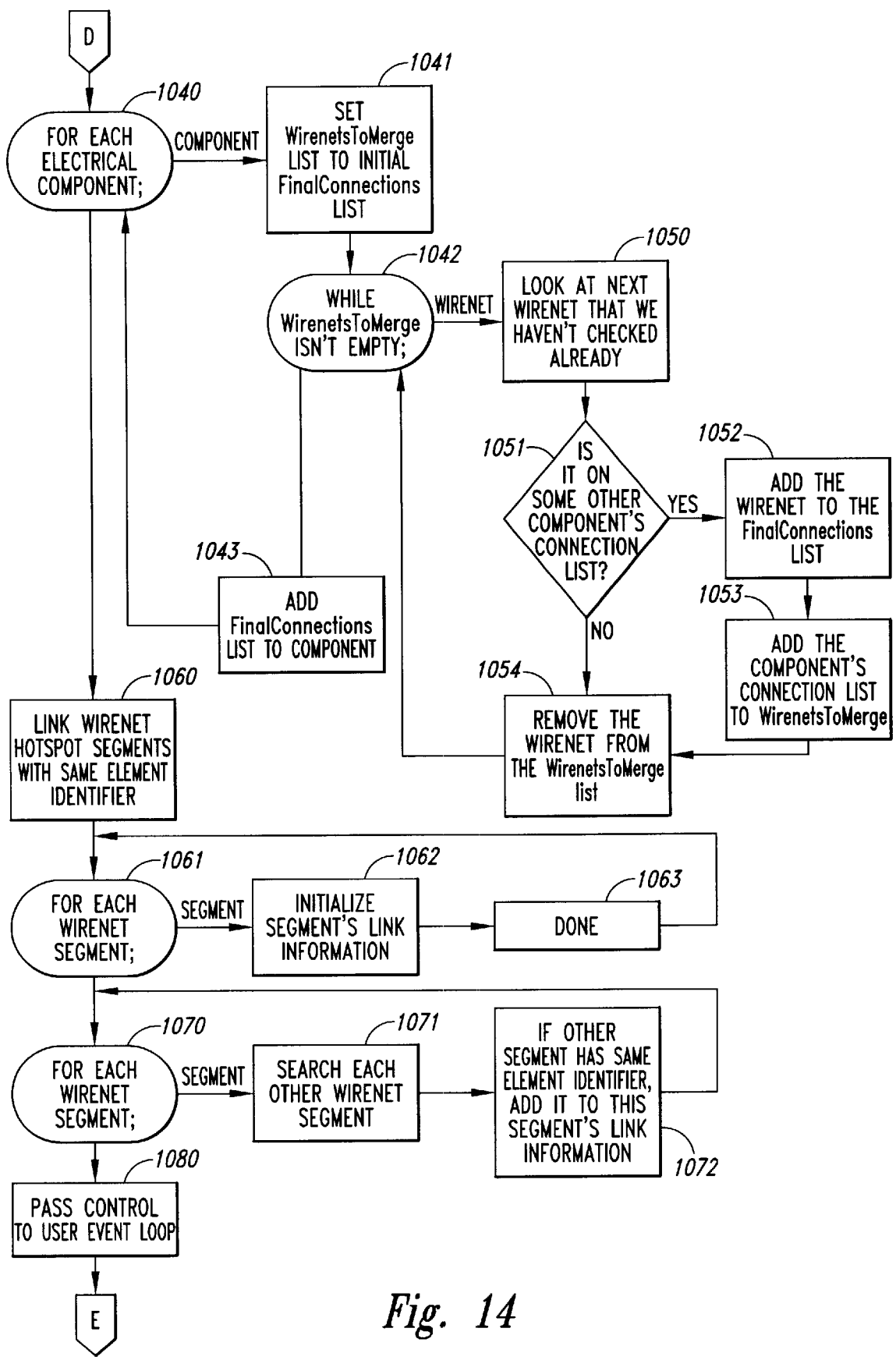
FIG. 14 is a diagram of 1000 continued.
Figure 15:
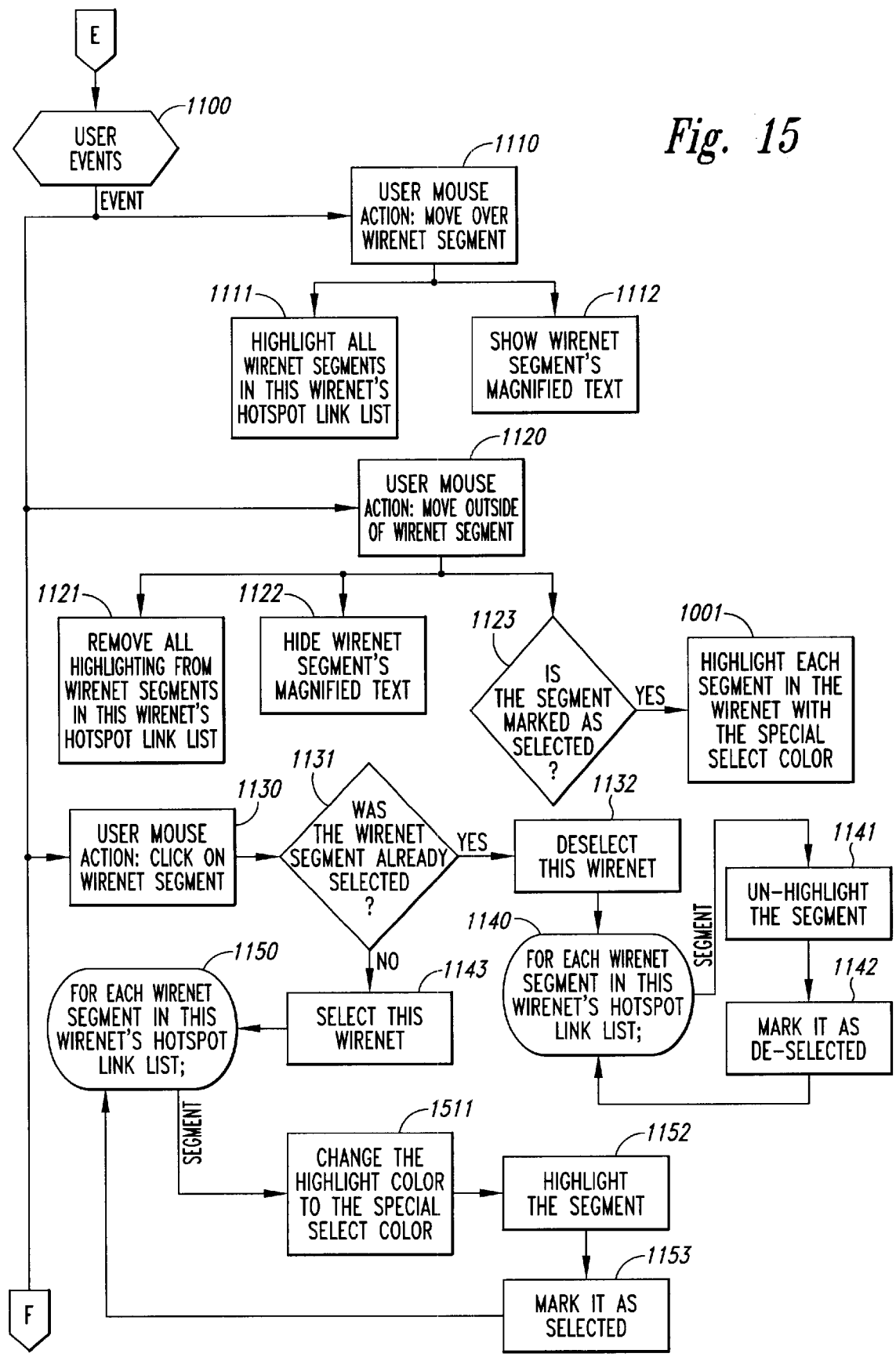
FIG. 15 is a further diagram of 1000 continued.
Figure 16:
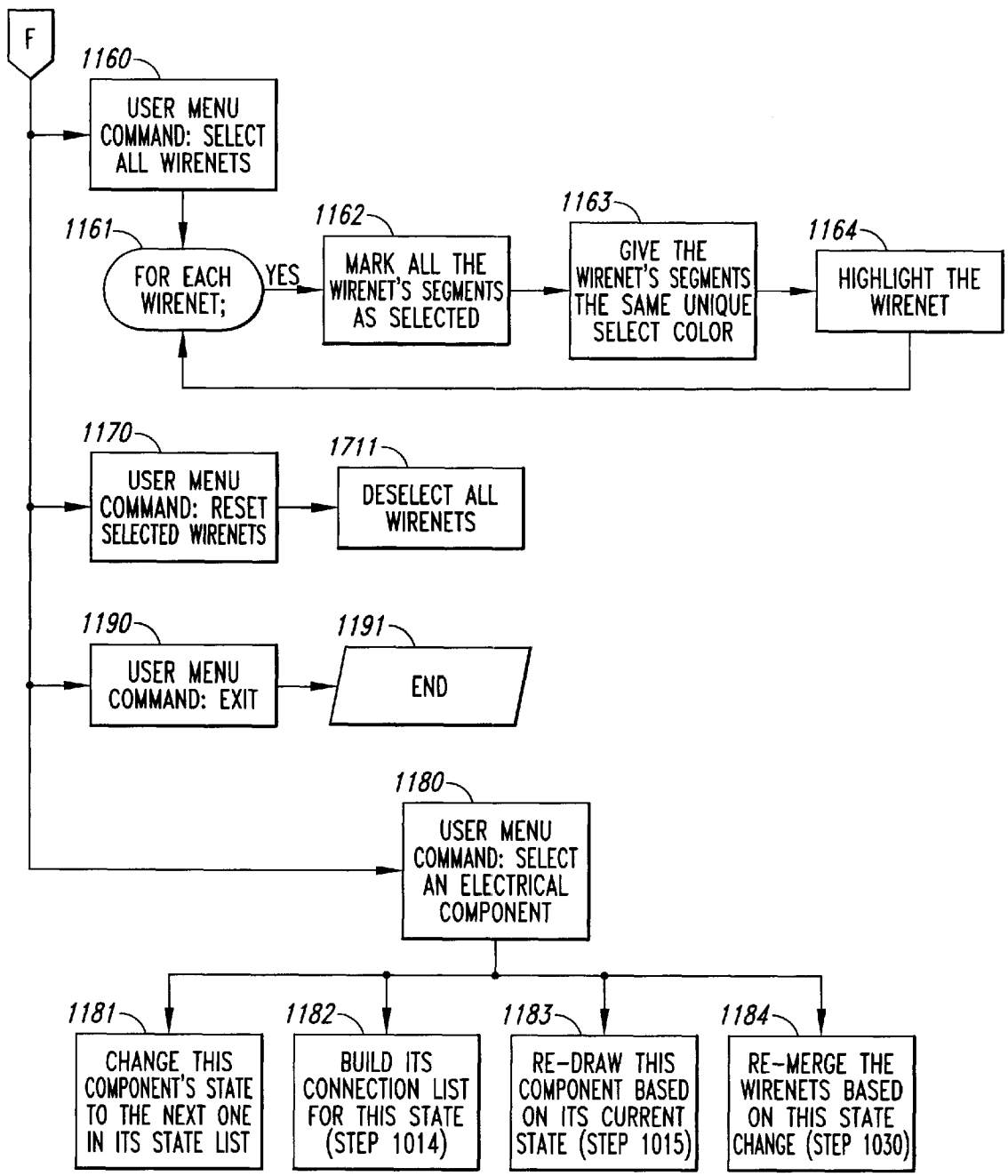
FIG. 16 is a further diagram of 1000 continued.
Figure 17:
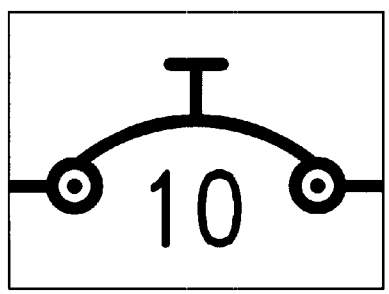
FIG. 17 is illustrative of Circuit Breaker 10.
Figure 18:
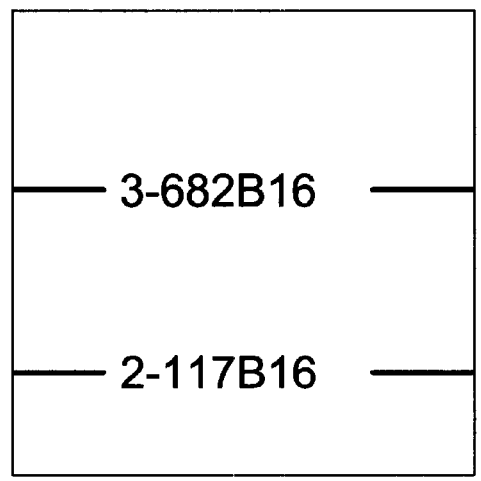
FIG. 18 shows wires interrupted by labels.
Figure 19:
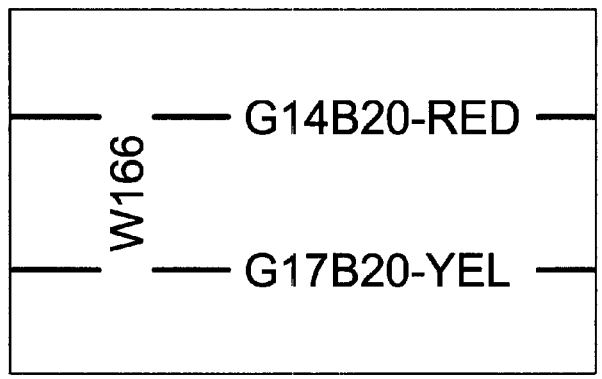
FIG. 19 shows wires interrupted by a "gap"

The two principal components of this invention are the Wiring Diagram Recognizer and the Intelligent Wiring Diagram Viewer:

The Intelligent Wiring Diagram Recognizer

The Intelligent Wiring Diagram Recognizer converts an illustration of a wiring diagram into an intelligent wiring diagram by:

a) at step 200: parse the input file and store graphical primitives in separate lists of circles, circular arcs, text elements, horizontal lines, vertical lines, oblique lines, and rectangles.

b) at step 300, apply pattern matching rules to the graphical primitives to recognize electrical components (circuit breakers, fuses, connectors, etc.)

c) at step 400, apply the Attachment Point algorithm to build wire networks connecting the electrical components d) at step 500, generate output files that provide intelligent wiring diagrams in the viewing system.

200: Store Graphical Primitives

Step 210 provides for the variant of the present invention in which the input data is raster. (We have to date only implemented it for vector drawing.) There are raster-to-vector conversion software packages available commercially, though none, as yet, have all the functionality required for this invention. Should such software become available, that would provide step 215. Everything downstream of step 215 presumes that the information is in vector format; so either the original information should be vector or suitable raster-to-vector conversion technology is employed at step 215.

At step 220, we iterate over all the vectors looking for polygons. Each polygon is a closed figure comprised of three or more line segments. The recognizer reasons about how the illustrations looks, not any particular way a piece of arc is composed. For example, if there is a rectangle in a diagram, it might be implemented as four line elements, or a single rectangle element, or a single polygon element. In all cases, the art will look the same. In all of these cases we treat the art as just a set of line segments. Thus, instead of storing the polygons in a polygon list, we store each line separately in the appropriate line list (horizontal, vertical or oblique). The details of line storage are discussed at step 260, below.

In step 230, we collect all the circles and store them in a list of circles, sorted according to the center point of the circle: if the y-coordinates of the circles are different, the one with the smaller y-coordinate comes first; if they have the same y-coordinate, the one with the smaller x-coordinate comes first. If they have the same center, the one with the smaller radius comes first. If they have the same center and radius, they are the same circle and we ignore the second one. For Computer Graphics Metafiles (CGM), this results in a bottom to top, left to right order.

In step 240, we collect circular arcs into an arc list, using the same sort algorithm. If two arcs have the same center and radius, they are arcs from the same circle, but they are not necessarily the same. In that case we just use the order within the input file as the sort order.

In step 250, we store text elements in a text list using the same sort order. In vector files, text has a number of important attributes that need to be store: the x,y position of the string, the string itself, the font, the character height, and the character orientation. All of these attributes must be stored internally for the recognition to succeed.

In step 260, we store line segments. The orientation (horizontal, vertical or oblique) is critical to the symbol recognition and wire net recognition algorithms, so the recognizer uses three different lists, one for each orientation.

Again, the recognizer reasons about how the art actually looks, so if there are two different line segments that are collinear and overlap, the recognizer merges them into a single line segment. This not only reduces complexity, but also avoids errors in wire net recognition where lines cross.

300: Recognize Symbols

Graphics recognition must be tolerant of imperfections in the art due to human error or other problems. If the endpoints of two line segments are within a few pixels of each other, they appear to the human eye to be touching and the recognizer should consider them to be coincident even though they are actually not. Thus, in all of the recognition algorithms, any reference to two objects touching or having the same endpoint or similar notions means that the objects a close enough.

Symbol recognition consists of a sequence of individual recognizers that search through the above lists looking for combinations of graphical primitives that go together to make up the desired symbol. In order to avoid ambiguity, the recognizer looks for the more complex symbols first. For example, small terminal circles are part of a number of symbols such as circuit breakers or fuses. However, such circles can be symbols by themselves, representing isolated terminals in a circuit. Thus, if the recognizer looked for terminal circles before circuit breakers, the circuit breaker finder would fail, since its terminals would have already been incorrectly recognizer as isolated terminals.

Because the recognizers scan the various lists of primitives repeatedly it is important (for both efficiency and to avoid recognition errors) to eliminate from consideration as many primitives as possible that serve some other purpose in the drawing. For example, sometimes circles are filled with many shading lines to make them appear gray. These shade lines are not essential for symbol recognition. Those superfluous lines are discraded in step 310. In addition, small line segments that are close together and collinear comprise dashed lines. Dashed lines serve a number of purposes in wiring diagrams such as linking off-sheet references to objects or for ganged components (see below). In step 320, we find dashed lines. We iterate over horizontal line segments. When we find one that is short enough, we see if there is another short one with the same y-coordinate to its right, close enough for a reasonable gap in a dashed line. If we find one, we again look to its right for anpother line segment. If this results in a list of at least three line segments, we instantiate a dashed-line object and populate it with all the line segments in that list. We find vertical dashed lines in the analogous fashion, starting at the bottom and scanning up. (Oblique dashed lines play no role in our recognition algorithms.)

We illustrate symbol recognition with step. 330, the circuit breaker recognizer; other recognizers are defined similarly. See Error! Reference source not found. The recognizer iterates over the circular arc list looking for arcs of approximately 60 with a reasonably sized radius and oriented either horizontally or vertically. It then looks for terminal circles at each endpoint; that is, circles of the right size such that the endpoints in question lie on the boundary of the circle. Circuit breakers may have a pair of small line segments representing a handle drawn at the mid-point of the arc. If the two terminal circles are found, the recognizer has found a circuit breaker. It instantiates a circuit breaker data structure which includes all the primitives (arc, circles, lines) that comprise the symbol and this object is stored in the circuit breaker list. The primitives are maked as being used in a symbol, so that they are no longer considered for other symbol recognition.

After all the individual symbols are recognized, the recognizer then looks for ganged symbols. These are two or more symbols joined together by a dashed line that represent componets that are physically joined together so that they operate as one unit. For example, a ganged circuit breaker consists of two or more breakers with a single handle. When an operator pulls or pushes the handle all of the breakers are either pulled or pushed simulataneously. The recognition of ganged circuit breakersis done in step 390. For each dashed line, the recognizer iterates over the list of breakers looking for any that the dashed line intersects. If two or more such breakers are found, the recognizer instantiates a ganged breaker with the list of the breakers that intersected the line.

At the end of the symbol recognition process, the system has in hand various lists of electrical components and all of the art that comprises those components is marked as inSymbol and will hence be ignored in the next step, Wire Net recognition.

400: Wire Net Recognition

Wires flow from symbol to symbol joining the symbols at predictable locations we call attachment points. For example, wires are attached to circuit breakers at the two terminal circles. Complicating the wire net detection problem is the fact that the line segments that represent the wires are usually interrupted by pieces of text for the wire labels and other gaps (See Error! Reference source not found and Error! Reference source not found.):

Another problem is that connectors are unpredictably sized and have no predictable attachment points; wires can be attached at any point along the edge of a connector.

At step 410, we handle the wire label text. We iterate over all the text elements and compute a reasonable sized bounding box. For each such box, we find all the similarly oriented lines that have an endpoint inside the box. If we find any, we instantiate a wire net with those lines and set that wire net's attachment point set to the other endpoints of the lines.

At step 420, we handle the gap text. We iterate over the text, as in 410, and look for pairs of line segments that would join if extended across the space defined by the text. If we find any such pairs, we instantiate another wire net for each pair and put both line segments in the net and initialize the nets attachment point set to the outermost endpoints of the lines.

At step 430, we iterate over each electrical symbol, excluding connectors. Each symbol has a know set of attachment points. For each such point we instantiate a wire net with that point as the initial attachment point. For example, a circuit breaker has two attachment points. Thus two wire nets would be created and each would have one attachment point initially.

At the end of step 430, then, the systems had a large number of instantiated wire nets, each with an initial (possible empty) set of lines and a set of attachment points.

At step 440, we iterate over every wire net. For each wire net, we iterate over all the unused lines. If either of the line's endpoints is the close enough to an attachment point, the line is added to the wire net, its other endpoint is added to that wire net's attachment points and the line is marked as inSymbol. We repeat this process until we no longer find any line to add to any wire net. At this point, if any wire net still has an empty line list, it is eliminated; this is what happens to many of, the wire nets that were instantiated in step 410. Initially, the lines we place in a wire net are those attached to the symbols. After that, additional lines that are added represent where the wires makes a 90-degree turn or attaches at an oblique angle; this is because we merged collinear line segments back in step 260.

At step 450, we merge wire nets. We do a double iteration comparing every pair of attachment points from every pair of wire nets. If the two points are close enough, the wire nets are merged. If they are not close enough, we then check if they are on opposite sides of some connector. In that case, the wire nets are merged as well. To merge two wire nets, we copy the lines and attachment points of the second net into the first and eliminate the second one. We keep performing this iteration until no more merges occur. At this point, every remaining wire net is complete.

500: Generate Output

Step 510 generates an Extensible Markup Language (XML) representation of the recognized intelligent graphics (IG) objects. For each IG object, we write out an XML hierarchy of elements and attributes that completely define the intelligence extracted from the graphic. This XML representation is used to generate the CGM Version 4 file used by the IG Viewer Control.

In generating the XML file, we first iterate over the wire nets writing out the elements and attributes that are defined for wire nets. We use the element object with the role=WIRENET and an hslist (hot spot list) element containing a hotspot for each line segment.

For example, the MT representation for a wire net with two line segments might be:

<object id="WN4" hslistid="HS0" role="WIRENET"></object>
<hslist id="HS0">
<hotspot>
<line id="LINE1" x0="−15274" y0="9744" x1="−14622"y1="9744"></line></hotspot>
<hotspot>
<line id="LINE2" x0="−13098" y0="9744" x1="−12663"
y1="9744"></line></hotspot>
</hslist>

Second, we iterate over all of the different electrical components writing out their markup. We use an object with role=$EC_{13}$COMP. We use the name attribute for the type of electrical component. Each component has one or more states, an $init_{13}$state, the state in which it is drawn. Each state is an object in its own right (role=$EC_{13}$STATE). We use draw and erase attributes to hold actual graphical elements that should be drawn or erased when the component enters that state. This is key to good visual effect during simulation. There is also a magtext attribute, which is a short description of the state. The hslist for the component describes the rectangular extent of the hotspot on the component.

For example, the XML representation for a circuit breaker might be:

<object id="EC419" hslistid="HS419"role="EC_COMP" name="CIRCUITBREAKER"states="S419-CLOSED S419-OPEN"inst_state="S419-CLOSED"></object>
<object id="S419-OPEN" role="EC STATE"draw="ArcCtr −9889 9771 218 163 −218 163 272;
Circle −9671 9880 54;
Circle −9671 9880 5;
Circle −10106 9880 54;
Circle −10106 9880 5;
Line −9944 10152 −9835 10152;
Line −9889 10043 −9889 10152;"
  erase="ArcCtr −9889 9635 218 163 −218 163 272;
"
Circle −9671 9744 54;
Circle −9671 9744 5;
Circle −10106 9744 54;
Circle −10106 9744 5;
Line −9944 10016 −9835 10016;
Line −9889 9907 −9889 10016;"
"
  magtext="CIRCUIT BREAKER OPEN"></object>
<object id="S419-CLOSED" role="$EC_{13}$STATE"connect="WN307 WN4"magtext="CIRCUIT BREAKER CLOSED"></object>
<hslist id="HS419">
<hotspot>
<rect id="Rect419" left="−10107" top="10345" width="436"
height="657"></rect>
</hotspot>
</hslist>

Third, we iterate over all of the external references (i.e. textual references to other graphics).

An example external reference (to diagram 24-54-02) looks like:

<object id="GRef424" role="GRAPHICREF">
<callout id="Callout424" hslistid="HS424">
<gfxref id="GFX424" refman="WDM" fignbr="24-54-02">24-54-02</gfxref>
</callout>
</object>
<hslist id="HS424">
<hotspot>
<substring id="SS424" x="−9073" y="9690" width="1048" height="131" start="1"end="8" font="OCRB" charheight="131" text="24-54-02" upx="0" upy="1"basex="1" basey="0"></substring>
</hotspot>
</hslist>

Fourth, we iterate over the list of electrical component labels (i.e. textual labels that identify individual electrical components contained on the graphic).

An example component label (for wire bundle W0513) looks like:

<object id="Equip426" role="TEXTREF"><callout id="Equip426C"hslistid="HS426">
<textref id="Equi426CR" refid="W0513" refloc="W0513">W0513
</textref></callout></object>
<hslist id="HS426">
<hotspot>
<substring id="SS426" x="14535" y="9200" width="1090" height="218" start="1"end="5" font="OCRB" charheight="218" text="W0513" upx="0"upy="1" basex="1"basey="0"></substring>
</hotspot>
</hslist>

Fifth, we write out XML markup for all of the text found on the graphic. This enables text search in the viewer application.

An example of this is:

<para id="P327" hslistid="HS844" text="57 RX DATA HI">57 RX DATA HI</para>
<hslist id="HS844">
<hotspot>
<rect id="Rect844" left="13501" top="−4540" width="1691"height="131"></rect>

</hotspot>
  </hslist>

The resulting XML file is a concise and parse-able representation of the intelligence discovered during the recognition step. The X file is used to generate the CGM Version 4 file, and is also useful for Quality Assurance and Testing purposes.

In step 520, we generate a Hypertext Markup Language (HTML) representation of the IG objects. The HTML file produced is the Web Page used by Internet Explorer to render the Intelligent Graphic inside the IG Viewer Control. The HTML file contains event-handling instructions for hotspots.

Two types of events are handled for hotspots: enter events and click events. An enter event occurs when the user moves the mouse over a hotspot region. A click event occurs when the user presses and releases the mouse button while over a hotspot region. This is how the system knows when to display a new graphic or link to a different application. In generating the HTML file, we first write out an HTML header. Next, we iterate over the hotspots generating the code for enter events and then the code for click events. Finally, we write the HTML footer.

The resulting HTML file enables the following features:

Dynamically displaying additional information about hotspots

Linking to other graphics

Linking to other applications (e.g. a database information system)

In step 530, we generate a CGM Version 4 file using the XML file and the original CGM file as inputs. CGM Version 4 allows both the visual aspects of a graphic and the user-interface behaviors (such as automatic highlighting and magnification) to be encoded in a single file. This CGM4 file is the only static input needed by the IG Viewer Control.

To build the CGM4 file the software performs several steps. Initially, the XML and source CGM files are opened and parsed. The content needed to generate the CGM4 file is stored internally in memory. The CGM4 Header is written out. Next, all text in the XML content that is identified as either an external reference or an electrical component label (i.e. a hotspot), is written in color to provide the user with visual feedback as to what text is selectable (hot). Then, viewports and hotspots for the wire nets and electrical components are added to the CGM4 file. The standard viewports and hotspots are written. The electrical component, hotspot and text layers are written. And finally, the CGM4 footer is written out.

The resulting CGM4 file provides the IG Viewer Control with the information needed to support the following features:

Wire net highlighting

Automatic text magnification

Full text searching

Electrical component state changing (e.g. turning a switch on and off)

1000: Intelligent Graphics Viewer

The CGM4 file contains hotspot information for:

Each wire net segment

Each electrical component

A wire net is a collection of directly connected wire segments.

1010: Build Internal Structures For Cgm4 File

IG Viewer control calls the ISOView engine with the CGM4 file and it is read and displayed. The ISOView engine is then queried so that the hotspot information from the CGM4 file can be retrieved and built into internal data structures for each wire segment and each electrical component. Next, we iterate over the list of electrical components adding component state, connection and drawing information. The state, connection and drawing information are initialized for each component.

For each component, build its state information. For example, for a fuse, add two states, open and closed. Each state contains a list of wire net segments that the component connects when in that state. The component information also contains the initial component state. For example, fuses are usually drawn closed, so that would be the initial state. When in this state it connects wire nets on either side. When the fuse is open it connects no wire nets.

For each component, build its connection information. Build the wire net connection list based on the initial state. For example, a closed fuse may connect two or more wire nets.

For each component, build its drawing information. Turn on or off graphic layers corresponding to the component's current state. For example, if a fuse is open, hide the original fuse art by drawing a "white out" layer of the closed fuse on the drawing, then turn on a color layer showing the open fuse.

1020: Set The Current States Of Each Electrical Component

Set all the electrical component state information based on the current state. For each wire net segment, initialize the internal data structure. Build each segment's internal data structure based on information from the CGM4 file.

1030: Merge Wire Nets

Cross reference all the wire nets that are connected in the current state. For instance, if wire net WN1 is connected to a fuse which connects WN1 and WN2 in the current state, and WN2 is connected to a switch that connects WN2 and WN3 in the current state, connect WN1 to both WN2 and WN3, connect WN2 to both WN1 and WN3, and connect WN3 to both WN1 and WN2. WN1 and WN2 are immediately adjacent to the fuse; WN1 is remotely connected to WN3.

Build immediately adjacent wire net connections for each component. Set each component's connections to an empty list. Add immediately adjacent connections to each component for the current state.

1040: Merge Remotely Connected Wire Nets

Initialize a list of wire nets yet to be merged to this component's list of immediately adjacent connections. Each wire net is associated with a final connections list. Initialize this list with the set of wire nets yet to be merged.

As we trace each set of connections we add new wire nets to the list of wire nets yet to be merge. We continue this process until the list of wire nets yet to be merged is empty. Take the next element of the list of wire nets yet to be merged. Search all the other unchecked components to see if this wire net is on its list of immediately adjacent connections. If the wire net is on this component's list of immediately adjacent connections, add the wire net to the final connections list. Add each wire net in this component's list of immediately adjacent connections to the list of wire nets yet to be merged, if it is not already there. Remove the current wire net from the list of wire nets yet to be merged. Add the final connections list to this component.

1060: Link Wire Net Hotspot Segments With Same Element Identifier

Connect and cross-reference all wire net segments in the same wire net. Each segment in the same wire net contains a related identifier produced by the recognizer and file builder. Initialize each wire net segment's internal link structure. Search through the list of other wire net segments. If another wire net segment has the same identifier add each one to the other's wire net segment cross-reference links.
1080: Pass Control To User Event Loop We are through building wire net structures for the current state of electrical components. Pass control to the user event loop.
1100: User Events The viewer is an event-driven application which responds to various events, typically an end-user action.
1110: User Mouse Action: Move Over Wire Net Segment The mouse passes into a wire net segment. ISOView raises a mouse event containing identifiers that enable the viewer to find the associated wire net segment in the internal data structures. Highlight all the segments in the wire net associated with this segment. Highlight all the segments in all the other wire nets found on adjacent components' final connection lists. Display any magnified text associated with this segment's wire net.
1120: User Mouse Action: Move Outside Of Wire Net Segment The mouse passes out of a wire net segment. ISOView raises a mouse event containing identifiers that enable the viewer to find the associated wire net segment in the internal data structures.

Remove highlighting from all the segments in the wire net associated with this segment. Remove highlighting from all the segments in all the other wire nets found on adjacent components' final connection lists. Hide any magnified text associated with this segment's wire net. Wire nets may be marked as selected if a user clicks the mouse while over the wire net. Each selected wire net is displayed in a different color. Selecting a wire net makes it stand out from other nearby wire nets that are not selected. Highlighting a wire net temporarily overrides the selection color. If this wire net is marked as selected then re-display it with its selection color.
1130: User Mouse Action: Click On Wire Net Segment Wire nets may be marked as selected if a user clicks the mouse while over the wire net. Each selected wire net is displayed in a different color. Selecting a wire net makes it stand out from other nearby wire nets that are not selected. Clicking on a wire net segment toggles the selection state for the segment's wire net and for any remotely connected wire nets as well.

If this segment's wire net is already in a selected state, turn off the selection color. We do this by turning off the selection state for all the segments in this segment's wire net and for any segments in remotely connected wire nets as well. Re-display the wire net segments without the selection color. Remember that all these segments are not currently selected (so the next time, the selection color will get turned on).

If this segment's wire net is not already in a selected state, turn on the selection color. We do this by turning on the selection state for all the segments in this segment's wire net and for any segments in remotely connected wire nets as well. Generate a selection color that is not currently being used. Re-display the wire net segments with the selection color. Remember that all these segments are currently selected.
1160: User Menu Command: Select All Wire Nets Sometimes the user would like to show every wire net in a different color. This could help trace circuits in the wiring diagram or help developers verify the behaviors of the recognizer, file build, and viewer.

For each wire net in the internal list follow the procedure for turning on the selection color (step 1143). Remember that all these segments are currently selected. Generate a selection color that is not currently being used. Highlight all the segments in this wire net and any wire nets connected in the current state.
1170: User Menu Command: Reset Selected Wire Nets Turn off (de-select) any selected wire nets. Follow the procedure for turning off the selection color for each selected wire net (step 1132).
1180: User Menu Command: Select An Electrical Component The user may change the state of an electrical component by clicking on it with the mouse. Each component has a state list. For example, a fuse has a list of two states, closed and open. Some components have more than two states. For example, a rotary switch may have three or more states.

Select the next state in the component's state list. If we have reached the end of the list, start again at the beginning. Build the connection list based on the new state (step 1014). Draw this component based on the new state (step 1015). Re-merge the wire nets based on the new state (step 1030).
1190: User Menu Command: Exit Exit the viewer.
SPECIFIC EXAMPLE OF SYSTEM FUNCTION

INVENTION DESCRIPTION

The Intelligent Wiring Diagram System automatically and quickly converts wiring diagrams into electronically useful, interactive graphics. This novel approach completely eliminates the need for manual re-authoring. Within a few seconds the software is able to accurately identify circuit continuity and nomenclature of interest and put hundreds of hotspots on a diagram. If an expert were asked to perform the same work, it would take could easily take many days of intensive labor to re-author and validate a single wiring diagram.

The invention consists of a set of software modules that perform the conversion and a graphics viewer that provides the interaction. These modules are:
A. ELECTRICAL COMPONENT RECOGNIZER The Electrical Component Recognizer searches through the graphical primitives in the original wiring diagram and applies heuristics in order to identify components such as fuses, circuit breakers, various types of switches, electrical connectors and relays.

Figure 20:
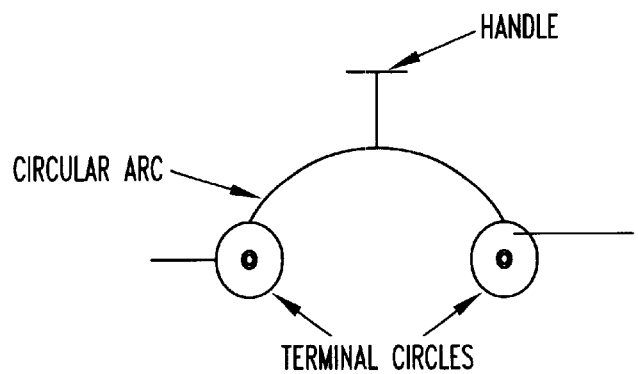
FIG. 20 illustrative of recognizing a circuit breaker symbol.

Example (FIG. 20): To identify a circuit breaker, the module first looks for a circular arc whose physical characteristics satisfy a pre-defined set of pattern rules. For each such arc, it looks for terminal circles and an optional handle, each of whose physical characteristics also must satisfy a pre-defined set of pattern rules. Moreover, identification of these graphic primitives as electrical components enables circuit simulation by the viewer when coupled with the established behaviors of the components.
B. WIRENET RECOGNIZER Using the electrical symbols found by the Electrical Component Recognizer, the Wirenet Recognizer employs a unique and powerful Attachment Point Algorithm to discover which lines in the diagram represent individual wires and to infer the electrical continuity. The algorithm works as follows:

For each electrical component there are predictable locations where wires can attach; these are the attachment points. For example, in a circuit breaker wires attach at the terminal circles. Similarly, there are attachment points for fuses, resistors, and the other electrical components, except connectors which are handled separately. Also, it is common for designers to erase part of a wire to make space for a text string such as the wire number or a notation. Consequently, for wirenet generation purposes, we consider text elements to have their own attachment points where wires may be attached.

The Attachment Point Algorithm consists of three major steps:

B1 SPROUTING WIRENETS

For each attachment point, we search for line segments which end at the point. These are the sprouts for our wirenets. After sprouting, therefore, each symbol now has a list of wirenets attached to it. Each wirenet consists of a list of line segments and a list of attachment points, which are the set of points where additional line segments can join that particular wire net.

Figure 21:
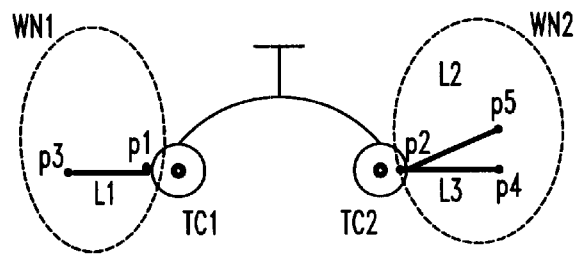
FIG. 21 shows wirenets beginning to sprout from a circuit breaker.

Example (FIG. 21): Consider a circuit breaker CB1 with terminal circles TC1 and TC2. The sprouting operation will cause the creation of two wirenets, WN1 and WN2 with attachment points {p1} and {p2} where p1 is the known point on circle TC1 where a wire may be attached and similarly for p2 on TC2.

Sprouting finds line L1 that has p1 as an endpoint and lines L2 and L3 which both have p2 as an endpoint. This results in wirenets WN1 and WN2:

CB1: wirenets: {WN1, WN2}
WN1: lines: {L1}
attachment points: {p1, p3}
WN2: lines: {L2, L3}
attachment points: {p2, p4, p5}
where p3 is the other endpoint of L1 and p4 and p5 are the other endpoints of L2 and L3 respectively.

Figure 22:
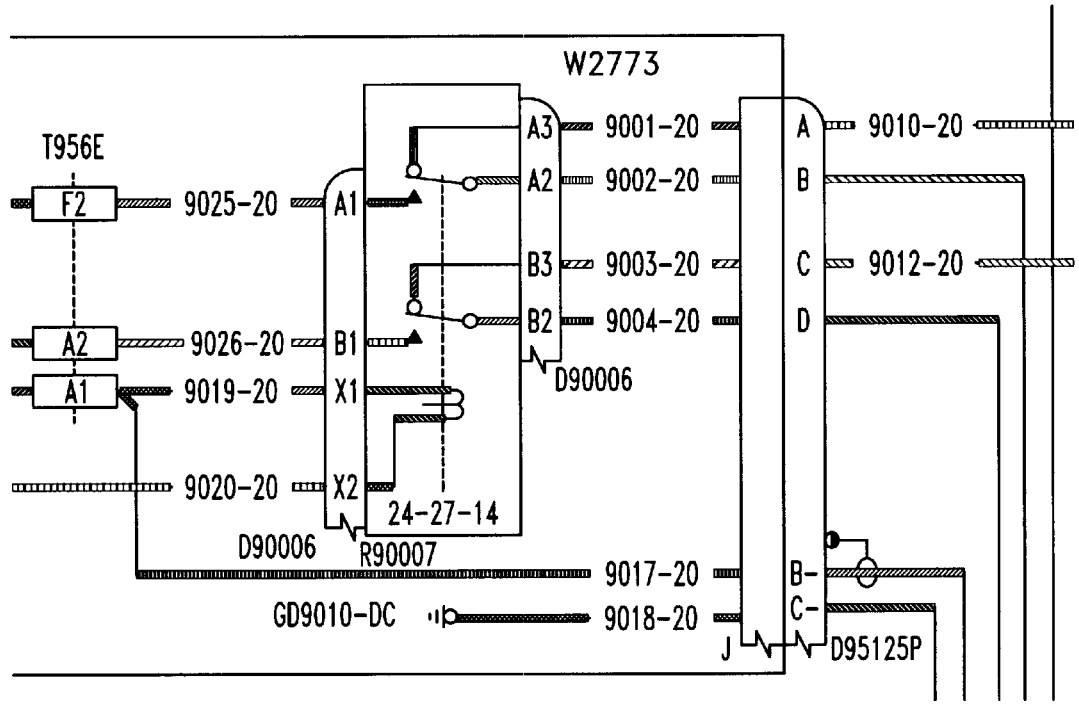
FIG. 22 is illustrative of part of a wiring diagram after sprouting with different wirenets.

FIG. 22 depicts part of a wiring diagram after all the wirenets have sprouted:

B2 GROWING WIRENETS

After all the sprouting is done, the wirenet recognizer iterates over all the wirenets looking for any new lines that end at any of the attachment points. When a line is added to a wire net, its other endpoint is added to the attachment point list for that wirenet. (Once the Wirenet Recognizer knows that no more lines end at a particular attachment point, that attachment point can be discarded to avoid needlessly reconsidering it). This process of growing wirenets continues until no more line segments can be found to add to any wirenet.

Figure 23:
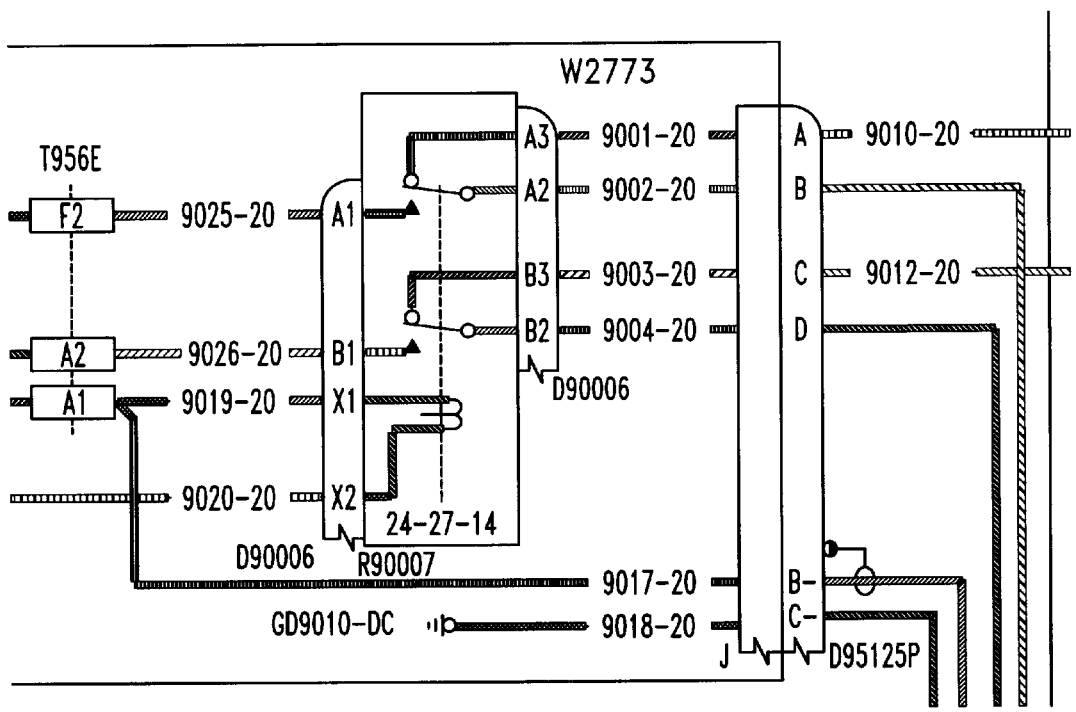
FIG. 23 shows part of a wiring diagram after growing wirenets.

FIG. 23 depicts the state of the diagram after the growing process is complete. At this point, the algorithm has found every wire segment, but the wirenets are still fragmented.

B3 MERGING WIRENETS

The next step is to merge wirenets. Each pair of wirenets is compared. If they share an attachment point, they are merged; that is all of the lines and attachment points of the second are copied to the first and the second discarded.

SPECIAL HANDLING OF CONNECTORS

In addition, two wirenets are merged if they each have an attachment point on opposite sides of the same connector directly opposite each other, derived by identical x or y coordinates. This is how continuity through a connector is achieved.

Figure 24:
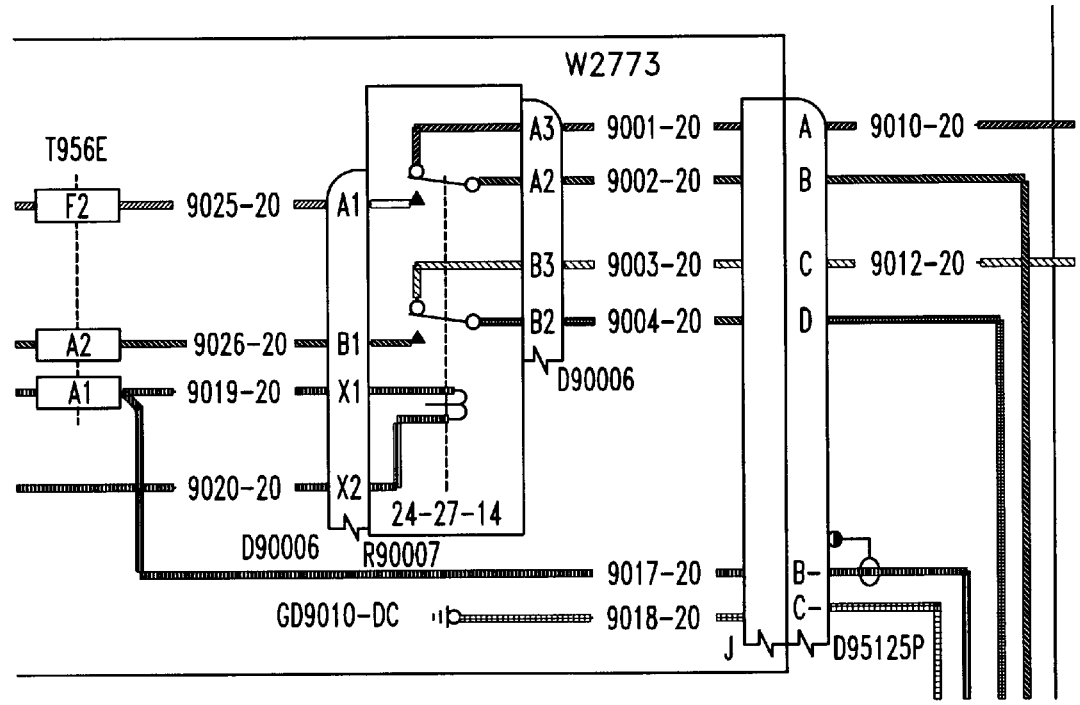
FIG. 24 shows part of a wiring diagram after merging wirenets.

As each merge occurs, 2 wirenets become 1 wirenet. At the end of this step, we have a greatly reduced set of wirenets each of which captures a full continuity. FIG. 24 shows the final results of the Attachment Point Algorithm.

B. NOMENCLATURE RECOGNIZER

Using text matching techniques, the Nomenclature Recognizer scans the text elements in the diagram and finds those that match wire numbers, wire bundles, grounds, splices, terminals and other equipment numbers from databases.

XML GENERATOR

Extensible Markup Language (XML) provides a standardized methodology for describing information in a document. We have created a unique Document Type Definition (DTD) for describing graphical objects and the relationships between them, including specific elements for describing electrical components and electrical continuity, as well as references to part information. The XML Generator produces the XML markup for all of the objects discovered by the three recognizers (electrical components, wirenets and nomenclature). The markup includes the geometry for each object's hotspot and the relationships between objects and other objects and between objects and hotspots.

For example, consider a switch to which the system has assigned the unique identifier SWITCH1. In order to make the switch interactive, it is linked to an HSLIST object which defines the rectangular hotspot. The switch also has two states, UP and DOWN, each of which is captured in an explicit object which the systems names S1-UP and S1-DOWN, respectively. The init-state attribute informs the viewer which of those states is the one depicted in the illustration as drawn by the illustrator. Each state has four important attributes:

connects: the value of this attribute is the list of wirenets that are connected when the component is in this state draw: the value of this attribute is a set of drawing instructions that tell the viewer what art to draw when the component is in this state erase: the value of this attribute is a set of drawing instructions that tell the viewer what art to erase when the component is in this state magtext: the value of this attribute is a string the viewer should display when the user points at the object and it is in this state.

There are three wirenets conected to the switch, WN1, WN2 and WN3. When the switch is up it connects WN1 to WN2; when it is down it connects WN1 to WN3. Each wirenet has its own HSLIST describing the x-y coordinates of all the line segments that comprise that wirenet.

The SGML representation for this switch might look like:
The switch itself:

<object id="SWITCH1" hslistid="HS1"role="EC COMP" name="SWITCH"states="S1-UP S1-DOWN"init state="S1-UP"></object>

<object id="S1-UP" role="EC STATE"erase="Line 203 1474 184 1532;"magtext="SWITCH%UP"></object>

<object id="S1-DOWN" role="EC$_{13}$STATE"connect="WN1 WN3"draw="Line 203 1474 184 1532;"magtext="SWITCH%DOWN"></object>

<hslist id="HS1">
<hotspot>
<rect id="Rect408" left="174" top="1533" width="39" height="59"></rect>
</hotspot>
</hslist>

The three wirenets connected to the switch

<WIRENET oid="WN1" hslists="HS2"></WIRENET>
<WIRENET oid="WN2" hslists="HS3"></WIRENET>
<WIRENET oid="WN3" hslists="HS4"></WIRENET>

The hotspots for each wirenet

<HSLIST hid="HS2">
<HOTSPOT>
... </HOTSPOT>
... (more HOTSPOTs—a wirenet is the union of many simple hotspots)
</HSLIST>

INTELLIGENT GRAPHICS VIEWER

Finally, we have invented a unique graphics viewer which not only renders the Wiring Diagram in its original form, but also uses the output of the XML generator to provide visual identification of objects and user-driven interactivity with the diagram. Every wirenet is "hot"; when the user points at the wire with a pointer device (e.g. a mouse), the wire and its complete continuity immediately highlight. Furthermore, the user can affect that continuity by interactively changing the state of electrical components. The viewer also allows full text searching and highlighting of hits found on the diagram.

Example (FIG. 25): Suppose the diagram depicts a switch with wirenet W1 attached on the right at the switch pivot point and wirenets W2 and W3 attached on the left at the upper and lower switch terminals; and suppose that the diagram shows the switch in the UP position. Then when the user points at W1, all of W1 and W2 will highlight, since the switch connects them. In addition, the user can "click" the switch to change its state to the DOWN position. When the user does this, the viewer will automatically redraw the switch in the down position and change the continuity, so that pointing at W1 will now highlight W1 and W3, but not W2. By change the states of various components, the user can easily see how electrical continuity is affected.

Figure 26:
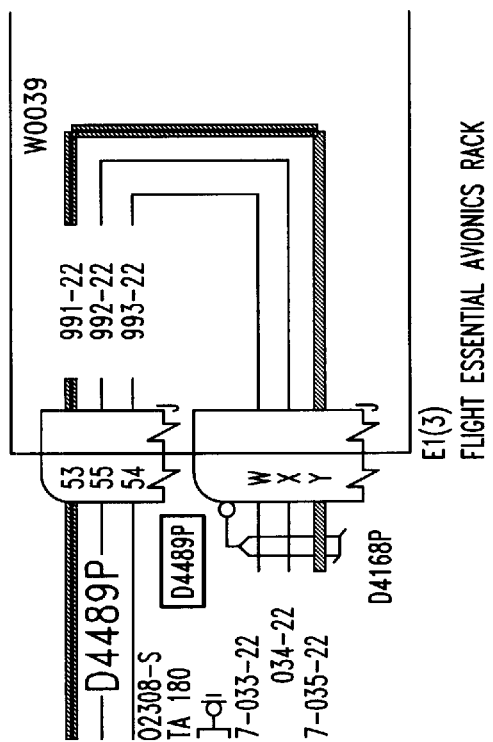
FIG. 26 is illustrative of database queries from the viewer.

In addition, using the hotspots identified by the Nomenclature Recognizer, the viewer supports database queries. By clicking a wire number or connector number, the user can quickly access part information by hyperlinking to other documents or other wiring diagrams. See FIG. 26.

Alternative Embodiment: If the wiring diagrams are originally authored using a Computer-Aided Design (CAD) tool then much of the intelligence may already be captured in the original CAD dataset. In that case the Symbol Recognizer and Wirenet Recognizer would be replaced by a CAD Dataset Interpreter which would extract symbol and wirenet information directly from the CAD dataset. Note, however, that this embodiment has significantly less generality because, for much of the legacy wiring diagrams, reliable CAD datasets are unavailable.

A PRACTICAL APPLICATION OF GRAPHICS RECOGNITION AND DELIVERY TECHNOLOGIES TO SUPPORT HIGHLY INTERACTIVE WIRING DIAGRAM INFORMATION TO TECHNICIANS TO SIGNIFICANTLY IMPROVE AIRPLANE MAINTENANCE

Consider this scenario: Suppose there is a problem reported with the N265 airspeed indicator. First, we must consult the diagram equipment list to find out what diagram N265 is on. After scanning through microfiche cards, we print the wiring diagram and take it to the airplane. We have to manually scan the printout looking for N265. Tests reveal that there is no power at pin 22 of the indicator. Using a highlighter to trace the circuitry in the diagram, we next test a transformer, then a circuit breaker, still finding no power at specific points in the circuit. At this point, we must follow an off-sheet reference to another diagram (meaning another visit to the microfiche) and continue the trouble shooting. Eventually, we discover that the C1315 circuit breaker is faulty and we need to order a spare. This means another trip back to the maintenance shack to look up the circuit breaker in the equipment list to obtain a part number and vendor information.

Our goal is to build an integrated wiring information system that solves all of the difficulties inherent in this scenario. We enter the problem component, N265, into the system, which responds with part information including a hyperlink to the correct diagram. When we click on that link, the system automatically finds N265 on the diagram and zooms in on the area of interest in the diagram. Again we test the component and find the problem at pin 22. We only need to click on the wire at that pin in the diagram and the full continuity is highlighted. Doing the same test, we work our way to the off-sheet reference, click on it and the system fetched the next diagram and again automatically zooms in on the area of interest. We find the problem circuit breaker and click on it to obtain the needed part number and vendor information.

In order to deliver such a system on a large scale, we have developed graphic recognition technology that can automatically convert wiring diagrams into these interactive objects.

RECOGNITION

There are two major recognition challenges in this work: recognizing electrical symbols, such as fuses, circuit breakers and connectors, and recognizing the networks of wires that flow between them. This work involves vector wiring diagrams, not raster, so our recognition algorithms involve reasoning about the relationships between graphical primitives (lines, circles, circular arcs, and text elements) rather than reasoning at the pixel level. In order to reliably process thousands of legacy images, created by different authors over many years, the algorithms must be tolerant of slight inaccuracies and not depend on specific choices of primitives when more than one implementation exists. For example:

a) We classify a line as horizontal if it's slope is less than 0.05 and vertical if the reciprocal of it's slope is less than 0.05.

b) When comparing coordinates, two x(or y) values are considered equal if their difference is small enough. The exact tolerance depends on the scale of the diagram's coordinate system.

c) We treat a polygon as if it were simply a set of line segments no different than any of the other line segments in the file. Thus if a recognition step needs to find a rectangle, it always looks for four line segments that satisfy the appropriate constraints. This avoids problems where one illustrator used a rectangle element and another actually drew four lines.

d) if two line segments are collinear and touch or overlap, we merge them into a single, longer line segment, because to the human eye there does appear to be a single line. This is especially important when we are recognizing wire nets, as it obviates problems were two wires cross orthogonally.

SYMBOL RECOGNITION

Wiring diagrams use a variety of standard symbols to represent electrical components such as circuit breakers, resistors, fuses and connectors. For each such symbol, we have developed a feature-based recognizer that searches for patterns in the graphical primitives that characterize that symbol.

A simple example of a symbol recognizer is that for a circuit breaker:

For each circular arc, A:
  if the angle is approximately 60 degrees and the radius of A within the acceptable range for a circuit breaker then:
    Let (x1,y1) and (x2,y2) be the endpoints of A.
    If there are terminal circles, c1 and c2, with radii acceptable for terminal circles such that (x1,y1) lies on c1 and (x2,y2) lies on c2 and if there is a short line segment, l1, orthogonal to A, ending at A's apes (and with its other endpoint outside of A) then:

If there is a short line, 12, segment orthogonal to 11, with its midpoint being the other endpoint of 11 then:
  CB={A, c1, c2, 11, 12} is a circuit breaker.
FIG. 27

Figure 28:
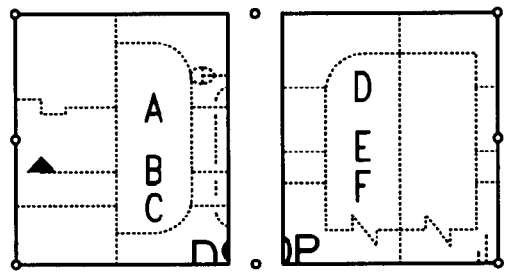
FIG. 28 shows connectors presenting unique problems because they can have arbitrary length and be complete or partial.

Other symbol recognizers work similarly, though they can vary considerably in complexity. Connectors present unique problems because they can have arbitrary length and be complete or partial (FIG. 28), but they still obey a set of predictable constrains in terms of the graphical primitives which comprise them.

The symbol recognizers are parameterized by a number of tolerance values (such as the radius of a terminal circle or the angle span of a circular arc). By experimentally refining those parameters, we are able to tune the recognizers to achieve over 99% accuracy on full manual sets.

Figure 29:
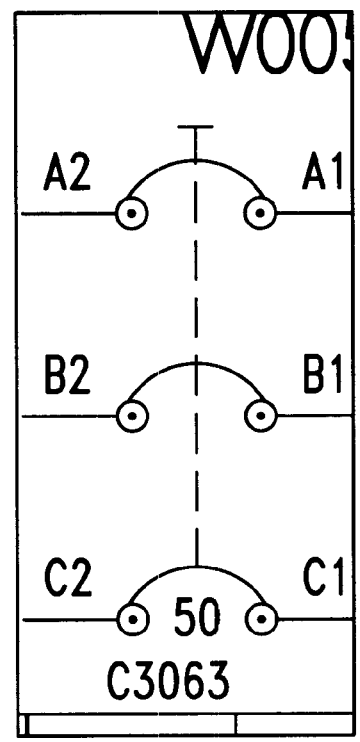
FIG. 29 is illustrative of gauged symbols where two or more symbols joined with a dashed line representing physically connected components which move together.
Figure 30:
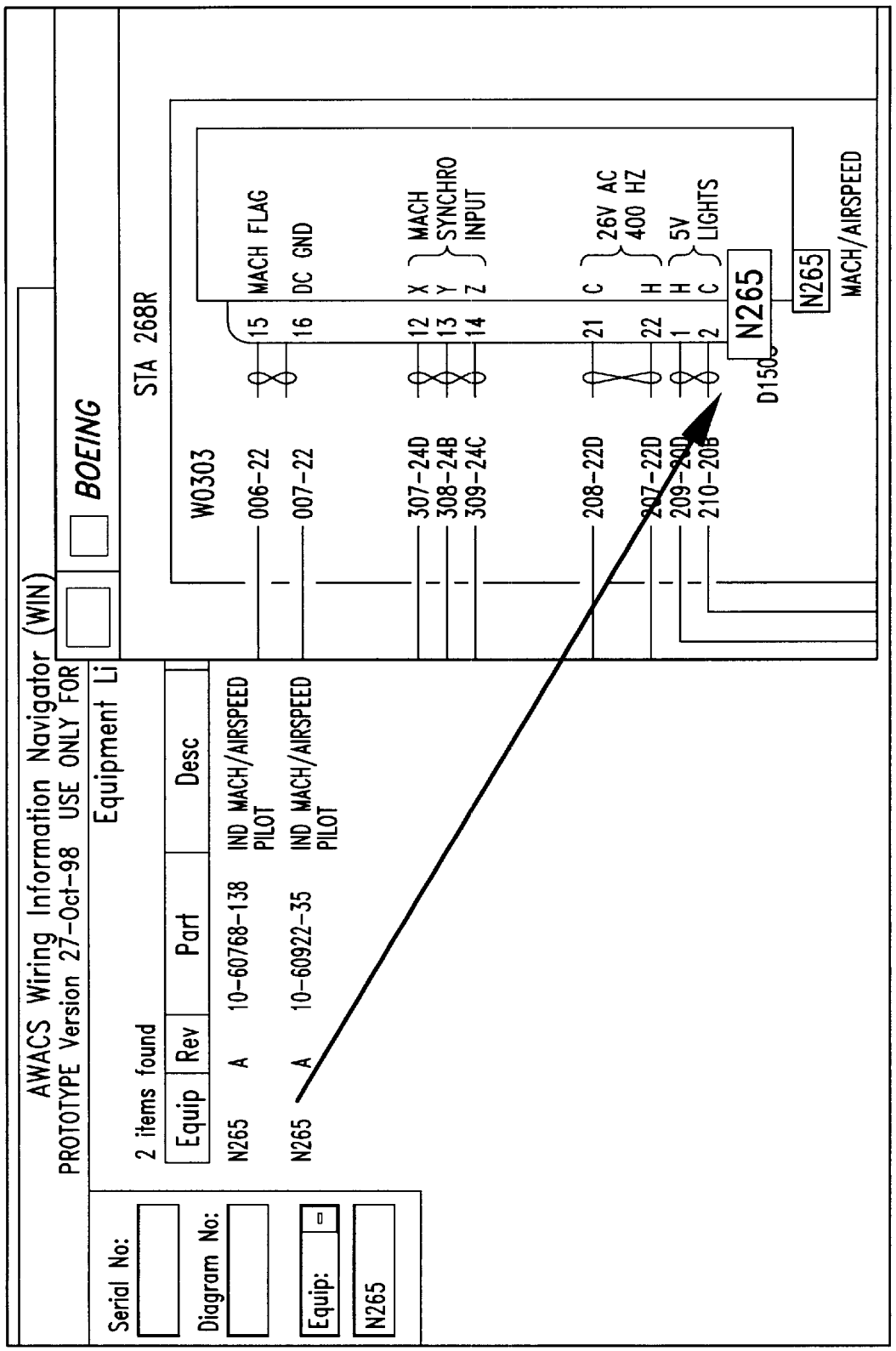
FIG. 30 relates to the airspeed indicator N265.

In addition to the basic symbology, we recognize ganged symbols, i.e. two or more symbols joined with a dashed line which represents physically connected components which move together (FIG. 29). In order to do this we must first perform dashed-line recognition. Again this is a matter of defining constrains that define what it means to be a dashed line and iterating over line segments looking for those that are small enough, collinear and close enough together to satisfy those constraints.

WIRE NET RECOGNITION

Having found the electrical symbols in the diagram, the next step is to determine which of the remaining line segments comprise the various wires and to infer the wiring continuity, that is how the wires connect various components together. We have devise an attachment point algorithm to perform this task. This algorithm is based on the following principles:

a) Wires connect to symbols at predicable point on the symbols; for example, wires connect to a circuit breaker at one of the two terminal circles.

b) wires change direction (from vertical to horizontal or vice versa) only at 'L' shaped intersections, not at 'T' or '+' shaped intersections.

c) The lines for a wire are often broken by test labels or other text were the amount of white space can vary considerably.

d) Two wires that are collinear and terminate on opposite sides of a connector represent the same continuity.

We represent wire nets with two lists:

a) a list of line segments that comprise the net and
b) a list of attachment points.

Recognition proceeds in four phases:

a) Seeding: we iterate over all electrical symbols (excluding connectors). For each one we instantiate one or more wire nets. Each such wire net will initially have an empty line list and an attachment point list with one or more of the predictable points. A circuit breaker, for example, will generate two wire nets, one for each of the terminal circles. On the other hand, a splice will have two attachment points, but only one wire net will be instantiated and both of the attachment points will belong to that wire net, because a splice does not have multiple states.

We also iterate over the text elements and look for line segments that intrude into an appropriately sized bounding box. If we find any, we instantiate an additional wire net. In this case, the net's line list is initialized with those lines and the attachment point list is initialized with the other endpoints of the lines.

b) Propagation: We iterate over each attachment point in each wire net looking for new line segments that end at that point. If we find such a line, we add it to the net's line list and add its other endpoint to the attachment point list.

c) Merging: Finally we iterate over every pair of wire nets to see if they should be merged. Merging means setting the line list of the first to the union of the two separate line lists and similarly for the attachment point list. There are two conditions that indicate a merge:
  a) if the nets share an attachment point or
  b) if there are attachment points p1 in net1 and p2 in net2 and a connector C such that p1 and p2 are directly opposite each other. In that way, we achieve wire net continuity through connectors.

d) Text Analysis: We use layout logic to group text elements into paragraphs. In addition we use text-pattern matching rules to identify references and equipment nomenclature.

XML REPRESENTATION

The output of the recognizer is an Extensible Markup Language (XML) representation of the various objects.

For example, the XML representation for a wire net with two line segments might be:

<object id="WN4" hslistid="HS0" role="WIRENET">
</object>
<hslist id="HS0"><hotspot><line id="LINE1" x0="−15274"
y0="9744" x1="−14622" y1="9744"></line></hotspot>
<hotspot>line id="LINE2"x0="−13098" y0="9744"
  x1="112663"
y1="9744"></line></hotspot></hslist>

The XML representation for a circuit breaker might be:
<object id="EC419" hslistid="HS419" role="EC$_{13}$
  COMP"name="CIRCUITBREAKER" states="S419-
  CLOSED S419-OPEN"init-state="S419-
  CLOSED"></object>
<object id="S419-OPEN" role="EC_STATE" draw=
  "drawing      instructions"erase="erase
  Instructions"magtext="CIRCUIT BREAKER
  OPEN"></object>
<object id="S419-CLOSED" role="EC_
  STATE"connect="WN307b WN4" magtext=
  "CIRCUIT BREAKER CLOSED"></object>
<hslist id="HS419"><hotspot><rect id="rect419"left="−
  10107" top="10345" width="436"height="657"></
  rect></ hotspot></hslist>

Note that the circuit breaker has two states, open and closed and that when it is closed it connects two wire net objects. When it is open, it connects nothing. Also, we can encode explicit draw/erase instruction in a state, so that when the object enters that state the viewer can indicate the new state by changing what the user sees.

Similarly, we generate XML markup for references, paragraphs and equipment nomenclature. One important benefit of this aspect is that we are able to generate discrepancy reports by comparing the text that is actually in the diagram with wiring databases that specify which equipment should be depicted. This quality assurance tool is resulting in significantly better quality in the data The Boeing Company delivers.

A separate application parses the XML representation and populates the original CGM file with application program structures that make the wiring diagram work interactively in our viewer.

INTELLIGENT GRAPHICS VIEWER

Figure 25:
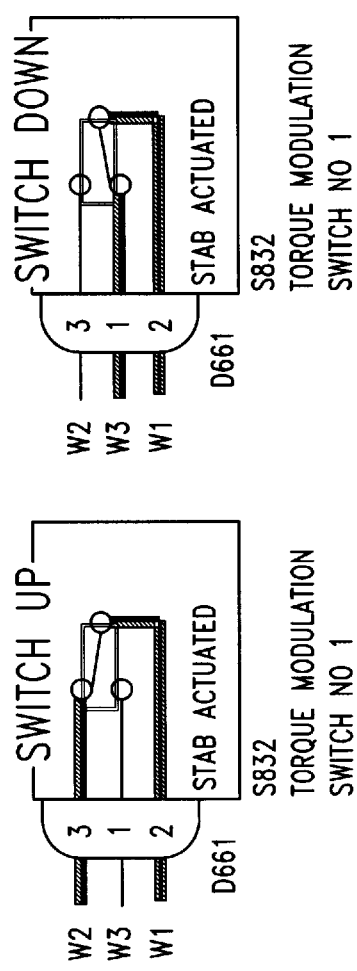
FIG. 25 shows manipulating a switch with the viewer.

Our intelligent graphics viewer is based on the Iso View ActiveX control from Itedo Corporation. We have developed our own control, IGView, which contains IsoView. IsoView renders the CGM files, highlights hotspots and exposes events to IGView. IGView responds to those events to provide powerful trouble shooting tools to the user. When the user points at a wire with the mouse cursor, the continuity for that wire is highlighted. IGView computes that continuity dynamically based on the states of all the electrical components (FIG. 25). The user changes the state of a component by clicking on its hotspot. For example, by clicking a switch, the user can toggle its state between down and up. I response, IGView will use the draw/erase instruction to make the switch visually move back and forth between the two positions. In addition, the continuity changes in accordance with the switch position. In the same manner, the user can simulate pulling a circuit breaker or blowing a fuse.

Of course, the viewer supports hyperlinking to other diagrams from reference text. In addition, because we recognize equipment nomenclature, the user can click on an equipment number to dynamically query databases regarding spare parts, vendors, and other critical information. In addition, because we catalog every paragraph, the viewer supports full text search and will automatically zoom in on the area of interest when the user links to a diagram from the database screen.

CONCLUSION

We have described a recognition algorithm for vector wiring diagrams that recognizes electrical symbols and induces wiring continuity. Because we are dealing with vector data and because there is considerable consistency in the production of these diagrams, we are able to achieve very high recognition accuracy.

We have also described a practical application of the results of this recognition, an intelligent wiring information system which provides enhanced trouble shooting capabilities: interactive wiring continuity display, component simulation, full text search, hyperlinking and database query functionality. This system also provides and excellent training tool.

We have hereinabove described the nature of electrical troubleshooting, how wiring diagrams are used, and the problems inherent in simply displaying them online without a layer of intelligence. We then discussed our solution to this problem, the Wiring Information Navigation System. This entails the use of symbol recognition technology for finding electrical components in vector illustrations, our attachment point algorithm for finding the layout of wires in the diagrams, the encoding of recognition results within the illustration and our viewing system which allows users to interaively model circuit continuity and query information systems.

What is claimed is:

1. A method for converting legacy wiring diagrams into intelligent wiring diagrams comprising:
   utilizing an intelligent graphics viewer for comprehending complex electrical circuitry;
   utilizing said intelligent graphics viewer to simulate changes in electrical continuity; and further
   utilizing said intelligent graphics viewer to access critical component information.

2. An intelligent wiring diagram system comprising in combination:
   an intelligent component recognizer for searching through graphical primitives in a wiring diagram and applying heuristics in order to identify components;
   a wirenet recognizer for determining:
      which lines in the diagram represent individual wires and to infer the electrical continuity;
      a nomenclature recognizer for scanning text elements in said wiring diagram and finding text elements which match generic patterns for wire numbers, wire bundles, grounds, terminals and other equipment numbers:
      extensible markup language (XML) generator for producing the XML markup of all objects discovered by a plurality of recognizers, said XML markup including the geometry for each object hotspot and the relationships between objects and between objects and hotspots, and,
      an output device comprising and intelligent graphics viewer for providing the wiring diagram in its original form, said intelligent graphics viewer further utilizing the output of the XML generator for providing visual identification of objects and user-driven interactively with said wiring diagrams.

3. The invention according to claim 2 wherein said wire numbers each consist of a wire bundle identifier and a wire id.

4. The invention according to claim 3 including means for determining which wire bundle identifier belongs with which wire id.

5. In combination:
   an XML generator;
   an intelligent graphics viewer for illustrating a wiring diagram in original format
   An XML representation for wirenets, electrical components and their states; and,
   said intelligent graphics viewer further providing visual identification of objects and user-driven interactivity with said wiring diagrams.

6. In combination:
   an electrical component recognizer for searching through the graphical primitives in a wiring diagram and applying heuristics in order to identify components; and,
   a wirenet recognizer for utilizing the electrical symbols provided by said electrical component recognizer and determining which lines in the wiring diagram represent individual wires conferring electrical continuity.

7. In combination in an intelligent wiring diagram system:
   an electrical component recognizer for searching through graphical primitives in a wiring diagram and applying heuristics to identifying components; and
   a wirenet recognizer utilizing electrical symbols formed by said electrical component recognizer and finding which lines in said wiring diagram represent individual wires.

8. In combination:
   an extensible markup language generator (XML);
   an intelligent graphics viewer responsive to the output of said XML generator for providing visual identification of objects and user-driven interactivity with a wiring diagram; and
   said intelligent graphics viewer further displaying the wiring diagram.

9. In combination in an intelligent wiring diagram system having an intelligent wiring diagram recognizer for converting a wiring diagram into an intelligent wiring diagram comprising the steps of:
   parsing an input file and storing graphical primitives in separate lists of circles, circular arcs, text elements, horizontal lines, vertical lines, oblique lines and rectangles;
   applying pattern matching rules to said graphical primitives for recognizing electrical components;
   applying an attachment point algorithm for building wire networks connecting said electrical components; and, then
   generating output files for providing intelligent wiring diagrams in a viewing system.

* * * * *